(12) United States Patent  (10) Patent No.: US 7,852,436 B2
Shimizu et al.  (45) Date of Patent: Dec. 14, 2010

(54) LIQUID CRYSTAL PANEL, AND LIQUID CRYSTAL DISPLAY

(75) Inventors: Takashi Shimizu, Ibaraki (JP);
Kentarou Takeda, Ibaraki (JP);
Hiroyuki Yoshimi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 134 days.

(21) Appl. No.: 12/208,021

(22) Filed: Sep. 10, 2008

(65) Prior Publication Data

US 2009/0066886 A1  Mar. 12, 2009

(30) Foreign Application Priority Data

Sep. 11, 2007  (JP) ............................. 2007-235492

(51) Int. Cl.
*G02F 1/1335* (2006.01)
(52) U.S. Cl. ............................. 349/96; 349/56; 349/84; 349/99
(58) Field of Classification Search ............... 349/56, 349/84, 96, 99
See application file for complete search history.

(56) References Cited

U.S. PATENT DOCUMENTS

| 7,326,364 B2 | 2/2008 | Joen et al. |
| 7,557,883 B2* | 7/2009 | Kawamoto et al. .......... 349/119 |
| 7,561,233 B2 | 7/2009 | Hisatake |
| 2005/0057714 A1 | 3/2005 | Jeon et al. |
| 2007/0172606 A1 | 7/2007 | Shunsuke et al. |
| 2007/0285602 A1* | 12/2007 | Takeda et al. ............... 349/117 |
| 2008/0008476 A1 | 1/2008 | Yamamoto |
| 2008/0165312 A1 | 7/2008 | Sakurazawa et al. |
| 2009/0066886 A1 | 3/2009 | Shimizu et al. |
| 2009/0128759 A1 | 5/2009 | Yoshimi et al. |
| 2009/0231528 A1 | 9/2009 | Nakano et al. |

FOREIGN PATENT DOCUMENTS

| JP | 2006-184835 A | 7/2006 |
| JP | 2006-268016 A | 10/2006 |
| JP | 2006-527394 A | 11/2006 |

(Continued)

OTHER PUBLICATIONS

Korean Office Action dated Feb. 25, 2010, issued in corresponding Korean Patent Application No. 10-2008-0066770.

(Continued)

*Primary Examiner*—Jennifer Doan
(74) *Attorney, Agent, or Firm*—Westerman, Hattori, Daniels & Adrian, LLP

(57) ABSTRACT

A liquid crystal panel of this invention has a first polarizer and a second polarizer disposed on both sides of a liquid crystal cell, and a first optical compensation layer disposed between the liquid crystal cell and the first polarizer, a second optical compensation layer disposed between the liquid crystal cell and the second polarizer, and a third optical compensation layer disposed between the first optical compensation layer and the second optical compensation layer, and wavelength dispersion of the liquid crystal cell satisfies $Re_{40}(450) > Re_{40}(550) > Re_{40}(650)$, wavelength dispersion of the first optical compensation layer and wavelength dispersion of the second optical compensation layer satisfy $0.7 < Re_{40}(450)/Re_{40}(550) < 1.05$, and wavelength dispersion of the third optical compensation layer satisfies $Re_{40}(450) > Re_{40}(550) > Re_{40}(650)$.

9 Claims, 8 Drawing Sheets

FOREIGN PATENT DOCUMENTS

| | | | |
|---|---|---|---|
| JP | 2007-148016 | A | 6/2007 |
| KR | 10-2006-0117995 | A | 11/2006 |
| KR | 10-2007-0004047 | A | 1/2007 |
| WO | 2005/078516 | A1 | 8/2005 |
| WO | 2005/091024 | A1 | 9/2005 |
| WO | 2006/090887 | A1 | 8/2006 |

OTHER PUBLICATIONS

Non-Final Office Action dated Mar. 18, 2010, issued in U.S. Appl. No. 12/269,521.

Partial English Translation of Japanese Office Action JP2007/300399 dated Apr. 23, 2010.

* cited by examiner

LIQUID CRYSTAL PANEL, AND LIQUID
CRYSTAL DISPLAY

FIELD OF THE INVENTION

The present invention relates to a liquid crystal panel, and a liquid crystal display.

DESCRIPTION OF THE RELATED ART

A liquid crystal display (hereinafter, also referred to as "LCD") is a device that displays characters and images using electro-optic characteristics of liquid crystal molecules. LCDs are widely used in portable phones, notebook computers, and liquid crystal television and the like. In a LCD, typically used is a liquid crystal panel in which polarizing plates are disposed on both sides of a liquid crystal cell. For example, in the case of a liquid crystal panel employing a normally black system, display is black when no voltage is applied (see, Japanese Patent Publication No. 3648240, for example).

In a conventional liquid crystal panel, an optical compensation layer and a polarizer are disposed in this order on either side of the liquid crystal cell (for example, viewing side of the liquid crystal cell). Further, on the other side of the liquid crystal cell (for example, opposite side of the viewing side of the liquid crystal cell), an optical compensation layer and a polarizer are disposed in this order. The aforementioned optical compensation layer is generally called "retardation layer" or "birefringence layer". The optical compensation layer is used for the purpose of an optical compensation of a liquid crystal panel such as improvement in viewing angle characteristic, improvement in color shift, improvement in contrast and the like.

SUMMARY OF THE INVENTION

Conventionally, LCDs have been made highly precious, and have had a variety of applications. Therefore, it is desired to provide LCDs realizing excellent display quality.

However, in conventional LCDs, there is a difficulty in providing neutral display with no coloring in every orientation, and an improvement in this point is demanded.

It is an object of the present invention to provide a liquid crystal panel and a liquid crystal display capable of achieving neutral display with substantially no coloring in every orientation.

The present invention provides a liquid crystal panel comprising a first polarizer and a second polarizer disposed on both sides of a liquid crystal cell, and a first optical compensation layer disposed between the liquid crystal cell and the first polarizer, a second optical compensation layer disposed between the liquid crystal cell and the second polarizer, and a third optical compensation layer disposed between the first optical compensation layer and the second optical compensation layer, wherein wavelength dispersion of the liquid crystal cell satisfies $Re_{40}(450) > Re_{40}(550) > Re_{40}(650)$, wavelength dispersion of the first optical compensation layer and wavelength dispersion of the second optical compensation layer satisfy $0.7 < Re_{40}(450)/Re_{40}(550) < 1.05$, and wavelength dispersion of the third optical compensation layer satisfies $Re_{40}(450) > Re_{40}(550) > Re_{40}(650)$, provided that $Re_{40}(\lambda)$ represents retardation value measured from the direction of polar angle of 40° at 23° C. with light of wavelength $\lambda$ nm.

Here, retardation of a substance depends on wavelength, and wavelength dispersion of retardation value can be generally classified into the following three kinds. The first wavelength dispersion is the case where the retardation value becomes larger as the wavelength becomes shorter in a visible light region. The second wavelength dispersion is the case where the retardation value little changes over the range of the wavelength from shorter side to longer side in a visible light region. The third wavelength dispersion is the case where the retardation value becomes smaller as the wavelength becomes shorter in a visible light region.

In a liquid crystal cell of the liquid crystal panel, the wavelength dispersion satisfies $Re_{40}(450) > Re_{40}(550) > Re_{40}(650)$. Therefore the liquid crystal cell has such a wavelength dispersion that the shorter the wavelength based on $Re_{40}$ in a visible light region, the larger the retardation value becomes (hereinafter, referred to as "positive dispersion").

Wavelength dispersion of the first optical compensation layer and the second optical compensation layer of the liquid crystal panel (hereinafter, also referred to as "first and second optical compensation layers") satisfies $0.7 < Re_{40}(450)/Re_{40}(550) < 1.05$. Therefore, the first and the second optical compensation layers have such a wavelength dispersion that the shorter the wavelength based on $Re_{40}$ in a visible light region, the smaller the retardation value becomes (hereinafter, referred to as "reverse dispersion"), or such a wavelength dispersion that retardation value little changes over the range from shorter wavelength side to the longer wavelength side based on $Re_{40}$ in a visible light region (hereinafter, referred to as "flat dispersion").

Wavelength dispersion of the third optical compensation layer satisfies $Re_{40}(450) > Re_{40}(550) > Re_{40}(650)$. Therefore, the third optical compensation layer has positive dispersion likewise the liquid crystal cell.

In the present invention, wavelength dispersion is based on $Re_{40}$.

In the liquid crystal panel of the present invention, a first optical compensation layer having reverse dispersion or flat dispersion is disposed on one side of a liquid crystal cell having positive dispersion, and a second optical compensation layer having reverse dispersion or flat dispersion is disposed on the other side of the liquid crystal cell, while a third optical compensation layer having positive dispersion is disposed between the first optical compensation layer and the second optical compensation layer.

The liquid crystal panel according to the present invention in which the liquid crystal cell and the first to third optical compensation layers are disposed in the order as described above is able to realize neutral display with almost no coloring in every orientation.

In a preferable liquid crystal panel of the present invention, the first optical compensation layer and the second optical compensation layer satisfy the relationship of $nx > ny \geq nz$.

In a preferable liquid crystal panel of the present invention, the liquid crystal panel satisfies the relationship of $nx \geq ny > nz$.

In a preferable liquid crystal panel of the present invention, the Nz coefficient of the third optical compensation layer is larger than Nz coefficient of the first optical compensation layer and the second optical compensation layer.

In a preferable liquid crystal panel of the present invention, the ratio of retardation value ($Re_{40}(450)/Re_{40}(550)$) of the first optical compensation layer and ratio of retardation value ($Re_{40}(450)/Re_{40}(550)$) of the second optical compensation layer are smaller than ratio of retardation value ($Re_{40}(450)/Re_{40}(550)$) of the liquid crystal cell.

In a preferable liquid crystal panel of the present invention, the first optical compensation layer and the second optical compensation layer contain at least one polymer selected from the group consisting of a cellulose-based, a modified polyvinyl acetal-based, and a polyester-based polymer as a principal component.

In a preferable liquid crystal panel of the present invention, the third optical compensation layer contains at least one polymer selected from the group consisting of a polyamide-based, a polyimide-based, a polyester-based, a polyetherketone-based, a polyamideimide-based, and a polyesterimide-based polymer as a principal component.

In a preferable liquid crystal panel of the present invention, the liquid crystal cell is in a vertically aligned (VA) mode.

In addition, according to other aspect of the present invention, there is provided a liquid crystal display. The liquid crystal display of the present invention has any one of the liquid crystal panels. The liquid crystal display of the present invention has excellent screen uniformity and high display quality.

DETAILED DESCRIPTION OF THE PREFERRED EMBODIMENTS

Figure 1:
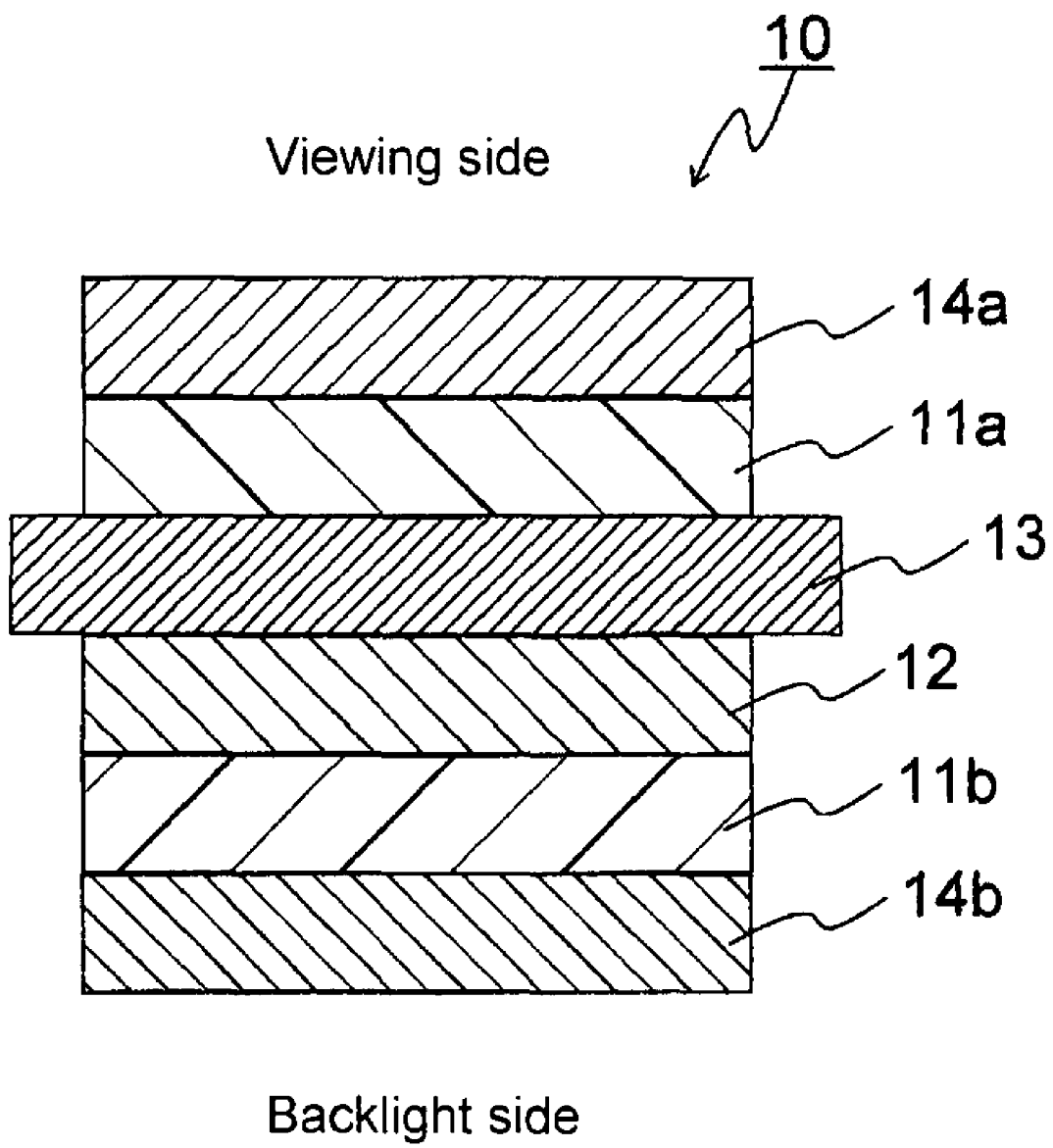
FIG. 1 is a schematic cross-section view showing one embodiment of the liquid crystal panel of the present invention.

The terms used herein have the following means.

(1) Optical compensation layer:

"Optical compensation layer" is a film exhibiting birefringence (anisotropy in refractive index) in the plane and/or in the thickness direction. The optical compensation layer includes, for example, those having in-plane birefringence coefficient and/or birefringence coefficient in the thickness direction at wavelength of 590 nm at 23° C. of $1 \times 10^{-4}$ or larger.

(2) nx, ny, nz:

"nx", "ny" and "nz" represent refractive indexes of different directions one another. The nx represents refractive index in the direction in which in-plane refractive index is maximum (X axial direction). The ny represents refractive index in the direction orthogonal to the X axial direction in the plane (Y axial direction). The nz represents refractive index in the direction orthogonal to the X axial direction and Y axial direction (Z axial direction).

Here, "nx=ny" includes not only the case where nx and ny are completely identical, but also the case where they are substantially identical. The case where nx and ny are substantially identical is for example the case that Re (590) is 0 nm to 10 nm, preferably 0 nm to 5 nm, and more preferably 0 nm to 3 nm.

"ny=nz" includes not only the case where ny and nz are completely identical, but also the case where they are substantially identical. The case where ny and nz are substantially identical is for example the case that Re (590)-Rth(590) is −10 nm to 10 nm, preferably −5 nm to 5 nm, and more preferably −3 nm to 3 nm.

(3) In-plane birefringence coefficient and birefringence coefficient in the thickness direction:

"In-plane birefringence coefficient ($\Delta n_{xy}(\lambda)$)" means difference in refractive index in the plane measured at 23° C., with light of wavelength $\lambda$ (nm). It may be determined by $\Delta n_{xy}(\lambda) = nx - ny$.

"Birefringence coefficient in the thickness direction ($\Delta n_{xz}(\lambda)$)" means difference in refractive index in the thickness direction measured at 23° C., with light of wavelength $\lambda$ (nm). It may be determined by $\Delta n_{xz}(\lambda) = nx - nz$.

(4) Re($\lambda$):

"In-plane retardation value (Re($\lambda$))" means retardation value in the plane measured at 23° C., with light of wavelength $\lambda$ (nm). Specifically, "in-plane retardation value (Re ($\lambda$))" means retardation value in the plane measured at 23° C., with light of wavelength $\lambda$(nm), at polar angle of 0° (normal direction of the plane of object to be measured).

When taking thickness of object to be measured as d(nm), Re($\lambda$) may be determined by Re($\lambda$)=(nx−ny)×d.

For example, Re(590) is in-plane retardation value measured at 23° C., with light of wavelength 590 (nm).

(5) Rth($\lambda$):

"Retardation value in the thickness direction (Rth($\lambda$))" means retardation value in the thickness direction measured at 23° C., with light of wavelength $\lambda$ (nm). When taking thickness of object to be measured as d(nm), Rth($\lambda$) may be determined by Rth($\lambda$)=(nx−nz)×d.

For example, Rth(590) is retardation value in the thickness direction measured at 23° C., with light of wavelength 590 (nm).

(6) $Re_{40}(\lambda)$:

"Retardation value at polar angle of 40° ($Re_{40}(\lambda)$)" means retardation value measured at 23° C., with light of wavelength $\lambda$ (nm) from the direction of polar angle of 40° (direction inclined by 40° from normal direction of the plane of object to be measured). When taking light path length from the direction of polar angle of 40° as $d_{40}$(nm), $Re_{40}(\lambda)$ may be determined by $Re_{40}(\lambda)=(nx-ny) \times d_{40}$.

For example, $Re_{40}(450)$ is retardation value measured at 23° C., with light of wavelength 450 (nm) from the direction of polar angle of 40°.

(7) Nz coefficient:

"Nz coefficient" is a value calculated by Rth($\lambda$)/Re($\lambda$). In the present invention, Nz coefficient is a value calculated by Rth(590)/Re(590) based on 590 nm. The meanings of Rth (590) and Re(590) are as described above.

(8) Orthogonal, parallel:

"Orthogonal" includes the case where the angle made by two optical axes is 90°±2°, and preferably 90°±1°. "Parallel" includes the case where the angle made by two optical axes is 0°±2°, and preferably 0°±1°.

(9) Polymer:

"Polymer" implies a high polymer having degree of polymerization (total degree of polymerization of each constituent unit when the polymer includes a plurality of constituent units) of equal to or more than 20, and a low polymer having degree of polymerization of equal to or more than 2 and less than 20 (also referred to as oligomer).

[Outline of Liquid Crystal Panel of the Present Invention]

The liquid crystal panel of the present invention has a first polarizer and a second polarizer disposed on both sides of a liquid crystal cell, and a first optical compensation layer disposed between the liquid crystal cell and the first polarizer, a second optical compensation layer disposed between the liquid crystal cell and the second polarizer, and a third optical compensation layer disposed between the first optical compensation layer and the second optical compensation layer.

Wavelength dispersion of the liquid crystal cell satisfies $Re_{40}(450)>Re_{40}(550)>Re_{40}(650)$. Therefore the liquid crystal cell has positive dispersion.

Wavelength dispersion of the first optical compensation layer and wavelength dispersion of the second optical compensation layer satisfy $0.7<Re_{40}(450)/Re_{40}(550)<1.05$. Therefore, the first optical compensation layer and the second optical compensation layer have reverse dispersion or flat dispersion.

Wavelength dispersion of the third optical compensation layer satisfies $Re_{40}(450)>Re_{40}(550)>Re_{40}(650)$. Therefore, the third optical compensation layer has positive dispersion.

As the first optical compensation layer and the second optical compensation layer, preferably a positive A plate in which index ellipsoid satisfies the relationship of nx>ny=nz, or a negative biaxial plate satisfying the relationship of nx>ny>nz is used.

As the third optical compensation layer, a negative C plate in which index ellipsoid satisfies the relationship of nx=ny>nz is preferably used.

The third optical compensation layer may be disposed between the first optical compensation layer and the second optical compensation layer. Therefore, the third optical compensation layer may be disposed between the first optical compensation layer and the liquid crystal cell, or may be disposed between the second optical compensation layer and the liquid crystal cell. Further, two of the third optical compensation layers may be provided, and one of them may be disposed between the first optical compensation layer and the liquid crystal cell, while the other may be disposed between the second optical compensation layer and the liquid crystal cell.

Preferably, the third optical compensation layer is disposed at least on the opposite side of the viewing side of the liquid crystal cell (hereinafter, also described by "opposite viewing side" of liquid crystal cell).

[Structural Example of Liquid Crystal Panel]

FIG. 1 shows one embodiment of a structure of the liquid crystal panel of the present invention. For facilitation of understanding, size, proportion and the like of each constituent member are different from the actual size, proportion and the like (ditto with other drawings).

As shown in FIG. 1, a liquid crystal panel 10 has a liquid crystal cell 13, a first polarizing plate 14a, a second polarizing plate 14b, a first optical compensation layer 11a, a second optical compensation layer 11b, and a third optical compensation layer 12. The first polarizing plate 14a is disposed, for example, on the viewing side of the liquid crystal cell 13. The second polarizing plate 14b is disposed, on the opposite viewing side of the liquid crystal cell 13. The first optical compensation layer 11a is disposed between the liquid crystal cell 13 and the first polarizing plate 14a. The third optical compensation layer 12 and the second optical compensation layer 11b are disposed between the liquid crystal cell 13 and the second polarizing plate 14b. The third optical compensation layer 12 is disposed between the liquid crystal cell 13 and the second optical compensation layer 11b.

Preferably, the first optical compensation layer 11a is provided to the first polarizing plate 14a so that the direction of absorption axis of the first polarizing plate (polarizer) 14a and the direction of slow axis of the first optical compensation layer 11a make an angle of 88° to 92°.

Preferably, the second optical compensation layer 11b is provided to the second polarizing plate 14b so that the direction of absorption axis of the second polarizing plate (polarizer) 14b and the direction of slow axis of the second optical compensation layer 11b make an angle of 88° to 92°.

Although not particularly illustrated, the third optical compensation layer 12 may be disposed between the liquid crystal cell 13 and the first optical compensation layer 11a.

Further, the first to third optical compensation layers may be a single layer, or a film having multilayer structure of two or more layers, respectively.

The first polarizing plate 14a and the second polarizing plate 14b include a polarizer, and a protective layer as necessary. As the protective layer, isotropic film having excellent transparency is generally used. The first optical compensation layer 11a or the second optical compensation layer 11b may be directly adhered to the polarizer. In this case, the first and the second optical compensation layers 11a, 11b also function as protective layers of the polarizer.

Figure 2:
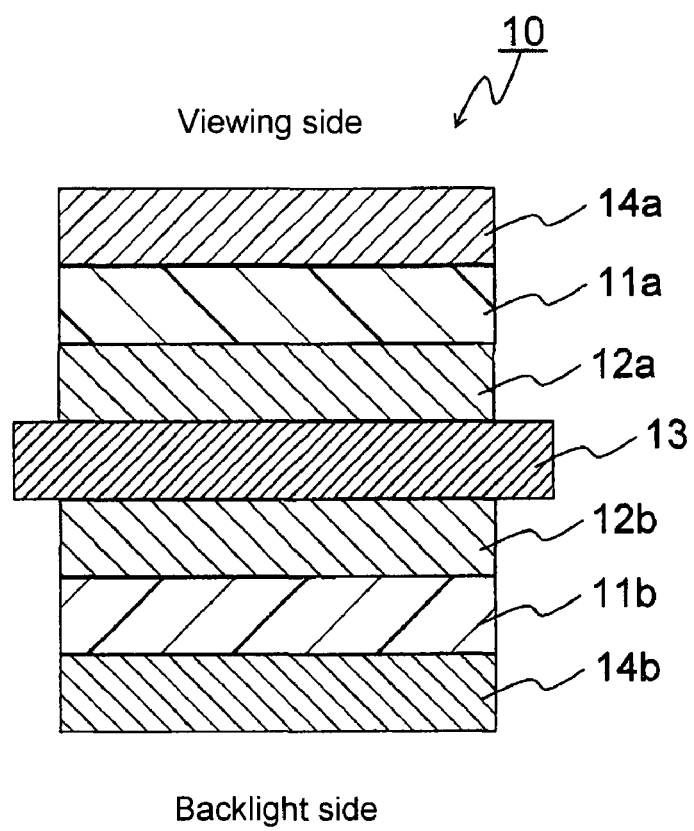
FIG. 2 is a schematic cross-section view showing other embodiment of the liquid crystal panel of the present invention.

FIG. 2 shows other embodiment of a structure of the liquid crystal panel of the present invention.

As shown in FIG. 2, in the liquid crystal panel 10, the third optical compensation layer 12a and the first optical compensation layer 11a are disposed between the liquid crystal cell 13 and the first polarizing plate 14a. The third optical compensation layer 12a is disposed between the liquid crystal cell 13 and the first optical compensation layer 11a. Further, the third optical compensation layer 12b and the second optical compensation layer 11b are disposed between the liquid crystal cell 13 and the second polarizing plate 14b. The third optical compensation layer 12b is disposed between the liquid crystal cell 13 and the second optical compensation layer 11b. Other than the above method, a structure of a liquid crystal panel is similar to that of the liquid crystal panel shown in FIG. 1.

Between these constituent members (optical members) of the liquid crystal panel, an arbitrary adhesive layer or an arbitrary optical member may be disposed. Examples of the arbitrary optical member preferably include a film satisfying isotropy (index ellipsoid satisfies nx=ny=nz).

[Liquid Crystal Cell]

As the liquid crystal cell of the present invention, for example, an active matrix type using a thin film transistor and the like may be exemplified. In addition, as the liquid crystal cell, a simple matrix type as is employed in a super-twisted nematic liquid crystal display may be used.

In the liquid crystal cell, a liquid crystal layer is generally formed by a pair of substrates.

Figure 3:
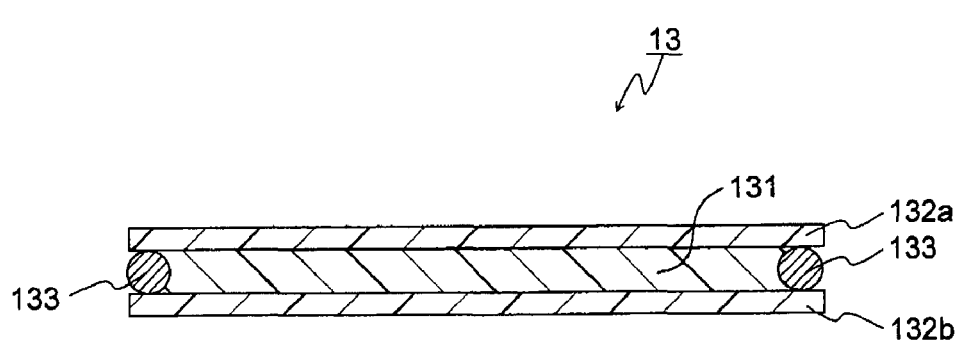
FIG. 3 is a schematic cross-section view showing one embodiment of a liquid crystal cell.

FIG. 3 shows one embodiment of a structure of the liquid crystal cell.

As shown in FIG. 3, the liquid crystal cell 13 is formed with a space by a spacer 133 being interposed between a pair of substrates 132a and 132b. In this space, a liquid crystal layer 131 enclosing liquid crystal molecules is provided. Although not particularly illustrated, one of the pair of substrates (active matrix substrate) is provided with, for example, a switching element (for example, TFT) that controls electro-optic characteristic of the liquid crystal, and a scanning line for supplying the switching element with a gate signal. The other of the pair of substrates is provided with, for example, a color filter.

The color filter may be provided to the active matrix substrate. Alternatively, when a tricolor light source of RGB is used as an illuminating means for the liquid crystal display (field sequential system), for example, the color filter may be omitted. The tricolor light source may further include a multicolor light source.

An interval between the pair of substrates (cell gap) is controlled, for example, by a spacer. The cell gap ranges, for example, from 1.0 μm to 7.0 μm. An orientation film formed, for example, of polyimide, is provided to the side where each substrate contacts with the liquid crystal layer. Further, the orientation film may be omitted, for example, in the case where initial orientation of liquid crystal molecules is controlled by utilizing fringe filed formed by a pattered transparent substrate.

Wavelength dispersion of the liquid crystal cell satisfies $Re_{40}(450)>Re_{40}(550)>Re_{40}(650)$. This is a liquid crystal cell having positive dispersion.

Wavelength dispersion of the liquid crystal cell (ratio of $Re_{40}$ between wavelength 450 nm and wavelength 550 nm) is preferably $1.0<Re_{40}(450)/Re_{40}(550)<1.1$, and more preferably $1.02<Re_{40}(450)/Re_{40}(550)<1.08$. Further, wavelength dispersion of the liquid crystal cell (ratio of $Re_{40}$ between wavelength 550 nm and wavelength 650 nm) is preferably $0.9<Re_{40}(650)/Re_{40}(550)<1.0$, and more preferably $0.92<Re_{40}(650)/Re_{40}(550)<0.98$. By providing such a liquid crystal cell in which wavelength dispersion is not relatively acute, with the first to third optical compensation layers, it is possible to greatly suppress light leakage in every orientation.

In the liquid crystal cell, index ellipsoid thereof preferably satisfies the relationship of $nx=ny<nz$. As the liquid crystal cell having index ellipsoid satisfying $nx=ny<nz$, a vertically aligned (VA) mode, a twisted-nematic (TN) mode, a vertically-aligned electric field control birefringence (ECB) mode, an optical compensation birefringence (OCB) mode and the like can be exemplified according to the classification of a liquid crystalline orientation mode. In the present invention, the liquid crystalline orientation mode of the liquid crystal cell is preferably VA mode.

In the condition where electric field is absent, Rth(590) of the liquid crystal cell having the index ellipsoid is preferably −500 nm to −200 nm, and more preferably −400 nm to −200 nm. The Rth(590) may be appropriately set by adjusting kinds of liquid crystal molecules and/or cell gap of the liquid crystal cell.

The liquid crystal cell of the VA mode utilizes a voltage control birefringence effect. Such the liquid crystal cell of the VA mode makes liquid crystal molecules oriented in homeotropic alignment in the absence of electric field, respond to electric field in the normal direction to substrate. Specifically, when the liquid crystal cell operates according to a normally black system, liquid crystal molecules are oriented in the normal direction to substrate in the absence of electric field. Since polarizing plates are disposed on both sides of the liquid crystal cell in the form of crossed nicols, straight polarized light fails to transmit the polarizer of the viewing side, so that the screen displays in black. On the other hand, in the presence of electric field, the liquid crystal cell operates so that the liquid crystal molecules are inclined at an azimuth of 45° with respect to the absorption axis of polarizing plate. Therefore, the transmittance is increased, and straight polarized light transmits the polarizer on the viewing side, so that the screen displays in white. As for operation of a liquid crystal cell of VA mode, concrete disclosures are found, for example, in Japanese Patent Application Laid-Open Publication No. S62-210423, Japanese Patent Application Laid-Open Publication No. H4-153621 and the like.

The liquid crystal cells of the VA mode may be those that are multi domains as described in Japanese Patent Application Laid-Open Publication No. H11-258605. Examples of such liquid crystal cell include "ASV (Advanced SuperView) mode" (trade name) manufactured by SHARP CORPORATION, "CPA (Continuous Pinwheel Alignment) mode" (trade name) manufactured by SHARP CORPORATION, "MVA (Multi-domain Vertical Alignment) mode" (trade name) manufactured by FUJITSU, "PVA (Patterned Vertical Alignment) mode" (trade name) manufactured by SAMSUNG Corporation, "EVA (Enhanced Vertical Alignment) mode" (trade name) manufactured by SAMSUNG Corporation, "SURVIVAL (Super Ranged viewing Vertical Alignment) mode" (trade name) manufactured by SANYO Electric. Co., Ltd. and the like.

In addition, as the liquid crystal panel of the present invention, for example, a liquid crystal cell installed in a commercially available liquid crystal display may be used as it is. Examples of commercially available liquid crystal display equipped with the liquid crystal cell of the VA mode include a liquid crystal TV manufactured by SHARP CORPORATION under the trade name of "AQUOS series", a liquid crystal TV manufactured by SONY Corporation under the trade name of "BRAVIA series", a 32V-inch wide model liquid crystal TV manufactured by SAMSUNG Corporation under the trade name of "LN32R51B", a liquid crystal TV manufactured by NANAO CORPORATION under the trade name of "FORIS SC26XD1", a liquid crystal TV manufactured by AU Optronics Corporation under the trade name of "T460HW01" and the like.

[First and Second Optical Compensation Layers]

Both of wavelength dispersion of the first optical compensation layer and wavelength dispersion of the second optical compensation layer satisfy $0.7<Re_{40}(450)/Re_{40}(550)<1.05$. This is an optical compensation layer having reverse dispersion or flat dispersion.

Wavelength dispersion (ratio of $Re_{40}$ between wavelength 450 nm and wavelength 550 nm) of the first and the second optical compensation layers satisfies preferably $0.75<Re_{40}(450)/Re_{40}(550)<1.00$, and more preferably $0.80<Re_{40}(450)/Re_{40}(550)<0.95$. Further, both of wavelength dispersions (ratio of $Re_{40}$ between wavelength 650 nm and wavelength 550 nm) of the first and the second optical compensation layers satisfy $1.01<Re_{40}(650)/Re_{40}(550)$, and preferably $1.05<Re_{40}(650)/Re_{40}(550)$.

Usually, an optical compensation layer having reverse dispersion can be defined by $Re_{40}(450)/Re_{40}(550)<0.97$. Further, an optical compensation layer having flat dispersion can be defined by $0.97\leq Re_{40}(450)/Re_{40}(550)<1.05$.

Preferably, the first optical compensation layer and the second optical compensation layer have index ellipsoid that satisfies the relationship of $nx>ny\geq nz$. The $nx>ny\geq nz$ means $nx>ny=nz$ (positive uniaxial), or $nx>ny>nz$ (negative biaxial). Particularly, it is more preferably that both of the first optical compensation layer and the second optical compensation layer satisfy the relationship of nx>ny=nz.

Nz coefficient of the first optical compensation layer and Nz coefficient of the second optical compensation layer are preferably 1 to 2, and more preferably 1 to 1.8, and particularly preferably 1.1 to 1.7.

Further, Nz coefficients of the first and the second optical compensation layers are preferably smaller than Nz coefficient of the third optical compensation layer.

The first and the second optical compensation layers may be a single layer or a laminate made of a plurality of layers, respectively. Thickness of the first and the second optical compensation layers is for example, 0.5 μm to 200 μm. Transmittance (T(590)) of the first and the second optical compensation layers is preferably 90% or larger.

The first and the second optical compensation layers may be formed of any arbitrary materials and by any arbitrary forming method as far as they have wavelength dispersion and index ellipsoid as described above. For example, the first and the second optical compensation layers may be formed from the entirely same film, or may be formed from films that are obtained form different materials or different forming methods, respectively.

Re(590) of the first and the second optical compensation layers is for example, 10 nm or larger, and preferably 5 nm to 200 nm. When index ellipsoid of the first and the second optical compensation layers satisfies the relationship of nx>ny=nz, Re (590) of the optical compensation layer is for example, 40 nm to 140 nm, and preferably 70 nm to 120 nm. When index ellipsoid of the first and the second optical compensation layers satisfies the relationship of nx>ny>nz, Re (590) of the optical compensation layer is for example, 30 nm to 130 nm, and preferably 60 nm to 110 nm.

When index ellipsoid of the first and the second optical compensation layers satisfies the relationship of nx>ny=nz, Re(590) is nearly equal to Rth(590).

When index ellipsoid of the first and the second optical compensation layers satisfies the relationship of nx>ny>nz, Rth(590) is larger than Re (590). In this case, difference (Rth(590)−Re (590)) between Rth(590) and Re(590) is for example, 10 nm to 100 nm, and preferably 20 nm to 80 nm.

As the first and the second optical compensation layers, for example, a retardation film containing a thermoplastic polymer such as a norbornene-based, a cellulose-based, a modified polyvinylacetal-based, and a polyester-based polymer is used.

By forming a film of composition containing a norbornene-based polymer, it is possible to obtain a retardation film having flat dispersion. By forming a film of composition containing at least one polymer selected from the group consisting of a cellulose-based polymer, a modified polyvinylacetal-based polymer and a polyester-based polymer, it is possible to obtain a retardation film having reverse dispersion.

First, a retardation film containing a norbornene-based polymer will be described. The norbornene-based polymer has a small absolute value of photoelastic coefficient (C[λ]. The λ represents wavelength). Absolute value of photoelastic coefficient (C[590]) of the norbornene-based polymer is preferably in the range of $1\times10^{-12}$ m$^2$/N to $1\times10^{-11}$ m$^2$/N.

Here, photoelastic coefficient refers to the liability to occurrence of birefringence when internal stress is caused by application of external force on a film. Photoelastic coefficient may be determined, by measuring in-plane retardation value of the film with light having wavelength of 590 nm by using a spectroscopic ellipsometer "M-220" (product name) manufactured by JASCO Corporation, under application of stress at 23° C. on a sample piece of 2 cm×10 cm, and calculating from inclination of a function of retardation value and stress.

In addition, wavelength dispersion of the retardation film containing a norbornene-based polymer has flat dispersion.

Here, "norbornene-based polymer" refers to a (co)polymer obtained by using a norbornene-based polymer having a norbornene ring as a part or the whole of a starting material (monomer). The term "(co)polymer" represents homopolymer or copolymer.

As for the norbornene-based polymer, a norbornene-based monomer having a norbornene ring (having double bond in norbornane ring) is used as a starting material. The norbornene-based polymer may have a norbornane ring or may not have a norbornane ring as a constituent unit in a (co)polymer state. Examples of the norbornene-based polymer having a norbornane ring as a constituent unit in a (co)polymer state include tetracyclo[4.4.1$^{2,5}$.1$^{7,10}$.0]deca-3-ene, 8-methyltetracyclo[4.4.1$^{2,5}$.1$^{7,10}$.0] deca-3-ene, 8-methoxycarbonyltetracyclo[4.4.1$^{2,5}$.1$^{7,10}$.0] deca-3-ene and the like. Examples of the norbornene-based polymer not having a norbornane ring as a constituent unit in a (co)polymer state include the (co)polymer obtained by using a monomer that becomes 5-membered ring as a result of cleavage. Examples of the monomer that becomes 5-membered ring as a result of cleavage include such as norbornene, dicyclopentadiene, 5-phenylnorbornene and derivatives thereof. When the norbornene-based polymer is a copolymer, alignment condition of the molecules is not particularly limited, and it may be a random copolymer, a block copolymer or a graft copolymer.

The retardation film containing a norbornene-based polymer may be produced, for example, by drawing a formed norbornene-based polymer film. As a method of forming the film, solvent casting method, melt extrusion method or the like can be exemplified. As the drawing method, vertical uniaxial drawing method, horizontal uniaxial drawing method, vertical-horizontal simultaneous biaxial drawing method, vertical-horizontal successive biaxial drawing method, or the like can be exemplified. Among these, horizontal uniaxial drawing method is preferable. Temperature at which the polymer film is drawn is preferably 120 to 200° C. Draw ratio is preferably more than 1 time and 4 times or less. Drawing may be a fixed end drawing method or a free end drawing method. According to the fixed end drawing method, it is possible to produce a retardation film satisfying the relationship of nx>ny>nz.

As the retardation film containing a norbornene-based polymer, for example, commercially available film may be used. Alternatively, the commercially available film may be used after being subjected to secondary process such as at least one of drawing process or contraction process. Examples of commercially available film include "ARTON series (ARTON F, ARTON FX, ARTON D)" (trade name) manufactured by JSR Corporation, "ZEONOR series (ZEONOR ZF14, ZEONOR ZF15, ZEONOR ZF16)" (trade name) manufactured by OPTES INC. and the like.

Next, a description will be given for a retardation film containing a cellulose-based polymer.

The cellulose-based polymer is preferably substituted with an acetyl group and a propionyl group. Degree of substitution of this cellulose-based polymer (this degree of substitution means "DSac (acetyl substitution degree)+DSpr (propionyl substitution degree)") is preferably 2 or more, more preferably 2.3 or more, and further preferably 2.6 or more. Upper limit of the degree of substitution is preferably 3 or less, more preferably 2.9 or less, and particularly preferably 2.8 or less. By setting the degree of substitution of the cellulose-based polymer within the above range, a retardation film having desired index ellipsoid as described above can be obtained.

Here, "DSac+DSpr" is an index showing to what extent three hydroxyl groups existing in a repeating unit of the cellulose-based polymer are substituted in average by an acetyl group or a porpionyl group.

The DSpr is preferably 1 or larger, more preferably 2 or larger, and particularly preferably 2.5 or larger. The DSpr is preferably 3 or less, more preferably 2.9 or less, and particularly preferably 2.8 or less. Since the cellulose-based polymer having DSpr of the above range becomes easy to be dissolved in a solvent, thickness of a film can be readily controlled. Further, by setting "DSac+DSpr" within the above range, and DSpr within the above range, it is possible to obtain a retardation film that satisfies the above index ellipsoid and has reverse dispersion.

The DSac and DSpr may be determined by the method described in [0016] to [0019] of Japanese Patent Application Laid-open Publication No. 2003-315538.

The cellulose-based polymer may have other substitution groups other than an acetyl group and a propionyl group. Examples of other substitution groups include such as ester groups such as butylate, and ether groups such as an alkyl ether group, an aralkylene ether group and the like.

The number-average molecular weight of the cellulose-based polymer is preferably from 5,000 to 100,000, more preferably from 10,000 to 70,000. When the number-average molecular weight is set into the range, an excellent productivity and a good mechanical strength can be obtained.

The method adopted to substitute the hydroxyl group(s) with the acetyl and propionyl groups may be any appropriate method. An example thereof is a method of treating cellulose with a sodium hydroxide solution to prepare alkaline cellulose, and acylating this cellulose with a mixture of predetermined amounts of acetic anhydride and propionic anhydride. The substitution degree "DSac+DSpr" is adjusted by hydrolyzing the acyl groups partially.

A retardation film containing a cellulose-based polymer may be obtained, for example, by preparing a solution by dissolving a cellulose-based polymer in a solvent, and applying the solution on an appropriate base material and drying the same. The retardation film may be used as it is, but preferably subjected to a drawing process. The drawing process is as same as that in the case of a retardation film containing a norbornene-based polymer. Further, as a retardation film containing a cellulose-based polymer, commercially available ones may be used.

Next, a description will be given for a retardation film containing a modified vinyl alcohol-based polymer.

The modified vinyl alcohol-based polymer may be a chain polymer having, as a repeat unit or repeat units, at least one of a structure represented by the following general formula (I) and a structure represented by the following general formula (II).

[Chemical Formula 1]

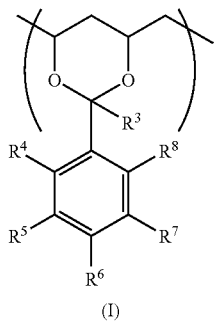

(I)

In the general formula (I), $R^3$ represents a hydrogen atom or an alkyl group having 1 to 8 carbon atoms. $R^4$ and $R^8$ each independently represent a hydrogen atom, a linear or branched alkyl group having 1 to 4 carbon atoms, a linear or branched alkoxy group having 1 to 4 carbon atoms, a linear or branched thioalkoxy group having 1 to 4 carbon atoms, a halogen, a nitro group, an amino group, a hydroxyl group, or a thiol group provided that $R^4$ and $R^8$ are not simultaneously hydrogen atoms. $R^5$ to $R^7$ each independently represent a hydrogen atom or a substituent.

[Chemical Formula 2]

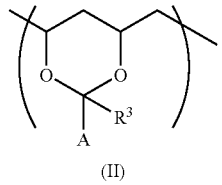

(II)

In the general formula (II), $R^3$ represents a hydrogen atom or an alkyl group having 1 to 8 carbon atoms. A represents a naphthyl group which may have a substituent, an anthranyl group which may have a substituent, or a phenanthrenyl group which may have a substituent provided that one or more carbon atoms which constitute the naphthyl group, the anthranyl group or the phenanthrenyl group may be substituted with one or more nitrogen atoms.

A polymer film containing a polymer having the repeating units itself exhibits reverse wavelength dispersion. Further, by drawing the polymer film, it is possible to obtain a film exhibiting optical biaxiality. Characteristics and film forming method of retardation film using the modified polyvinylacetal-based polymer are described in detail in paragraphs [0060]-[0084] in Japanese Patent Application Laid-open Publication No. 2006-65258. General formula (I) in the present specification corresponds to general formula (V) in the publication, and general formula (II) in the present specification corresponds to general formula (VI) in the publication. In the present specification, the description will be omitted as they are regarded as being described in the paragraphs [0060]-[0084] of the publication.

Even when a polyester-based polymer is used, it is possible to produce a retardation film having index ellipsoid that satisfies the relationship of nx>ny≧nz, and having reverse dispersion.

[Third Optical Compensation Layer]

Wavelength dispersion of the third optical compensation layer satisfies $Re_{40}(450) > Re_{40}(550) > Re_{40}(650)$. This is an optical compensation layer having positive dispersion.

Wavelength dispersion (ratio of $Re_{40}$ between wavelength 450 nm and wavelength 550 nm) of the third optical compensation layer satisfies preferably $1.0 < Re_{40}(450)/Re_{40}(550) < 1.2$, and more preferably $1.05 < Re_{40}(450)/Re_{40}(550) < 1.15$. Further, wavelength dispersion (ratio of $Re_{40}$ between wavelength 650 nm and wavelength 550 nm) of the third optical compensation layer satisfies preferably $0.9 < Re_{40}(650)/Re_{40}(550) < 1.0$, and more preferably $0.92 < Re_{40}(650)/Re_{40}(550) < 0.98$.

In particular, when ratio of $Re_{40}(\lambda)$ of a liquid crystal cell satisfies $1.0 < Re_{40}(450)/Re_{40}(550) < 1.1$, a third optical compensation layer used in the liquid crystal cell preferably has a ratio satisfying $1.0 < Re_{40}(450)/Re_{40}(550) < 1.2$. Combination of these liquid crystal cell and third optical compensation layer enables production of a liquid crystal panel in which light leakage is greatly suppressed in every orientation.

In the third optical compensation layer, index ellipsoid thereof preferably satisfies the relationship of nx≧ny>nz. The nx≧ny>nz means nx=ny>nz or nx>ny>nz. Particularly, it is more preferable that the third optical compensation layer satisfies the relationship of nx=ny>nz.

When index ellipsoid of the third optical compensation layer satisfies nx>ny>nz, Nz coefficient of the third optical compensation layer is preferably 1.1 to 200, and more preferably 1.1 to 100.

The third optical compensation layer may be a monolayer, or a laminate of plural layers. Thickness of the third optical compensation layer is preferably 0.5 to 200 µm. Transmittance (T(590)) of the third optical compensation layer is preferably 90% or more.

When index ellipsoid of the third optical compensation layer satisfies nx=ny>nz, Re (590) of the third optical compensation layer is for example, less than 10 nm, preferably equal to or less than 5 nm, and more preferably equal to or less than 3 nm.

When index ellipsoid of the third optical compensation layer satisfies nx>ny>nz, Re (590) of the third optical compensation layer is for example, 5 nm to 200 nm, and preferably 30 nm to 130 nm.

Rth(590) of the third optical compensation layer can be appropriately set, for example, depending on retardation value in the thickness direction of the liquid crystal cell or the like. Rth(590) of the third optical compensation layer is, for example, 100 nm to 400 nm, preferably 120 nm to 350 nm, and particularly preferably 150 nm to 300 nm.

As the third optical compensation layer, for example, a retardation film containing a non-liquid crystal polymer is used.

As the non-liquid crystal polymer, a polyamide-based, a polyimide-based, a polyester-based, a polyetherketone-based, a polyamideimide-based, a polyesterimide-based or the like polymer is preferable. A retardation film formed from these polymers has excellent heat resistance, chemical resistance and transparency, and rich stiffness. These polymers are described, for example, in paragraphs [0018]-[0072] of Japanese Patent Application Laid-open Publication No. 2004-46065. A retardation film made mainly of at least one kind selected from these polymers exhibits positive dispersion.

Either one kind of these polymers may be used alone. Also a polymer mixture of two or more kinds having different functional groups, for example, such as a mixture of polyaryletherketone and polyamide may be used. Among these polymers, polyimide is particularly preferably since it has high transparency, high orientation and high drawability.

Molecular weight of the polymer is not particularly limited, and for example, weight average molecular weight (Mw) is preferably 1,000 to 1,000,000, and more preferably 2,000 to 500,000.

A retardation film used as the third optical compensation layer may contain any appropriate additive. The additive includes, for example, a plasticizer, a heat stabilizer, a light stabilizer, a lubricant, an antioxidant, UV absorber, a flame retardant, a colorant, an antistat, a compatibilizer, a crosslinker, a thickener and the like. Content of the additive is preferably more than 0 and 10 or less parts by weight, relative to 100 parts by weight of the polymer which is a principal component. Retardation films used as the first and the second optical compensation layers may also contain any appropriate additive.

[Polarizing Plate]

In the liquid crystal panel of the present invention, it is preferable that the first polarizing plate and the second polarizing plate are disposed in such a positional relation that their absorption axes are orthogonal to each other. As described above, the first polarizing plate and the second polarizing plate include a polarizer, and a protective layer if necessary.

FIG. 4 shows various embodiments of a structure of a polarizing plate.

Figure 4A:
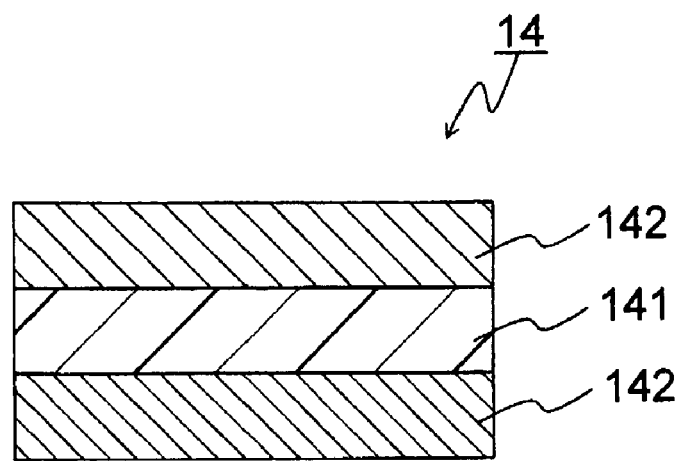
FIGS. 4A, 4B, and 4C are schematic cross-section views showing each embodiment of a polarizing plate.
Figure 4B:
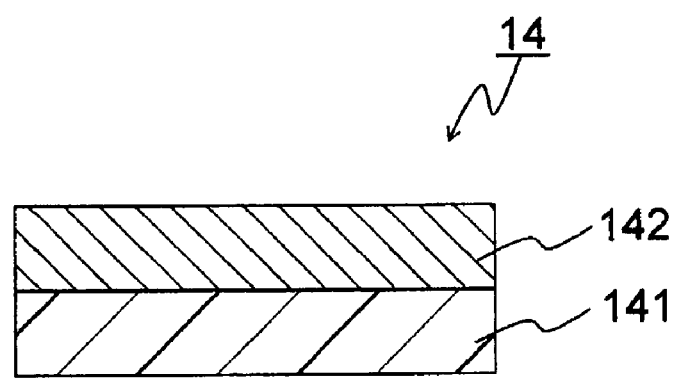
Figure 4C:

In a polarizing plate 14 shown in FIG. 4A, a protective layer 142 is laminated on both sides of a polarizer 141. In a polarizing plate 14 shown in FIG. 4B, a protective layer 142 is laminated on one side of a polarizer 141. A polarizing plate 14 shown in FIG. 4C is made of only a polarizer 141. In the cases of FIGS. 4B and 4C, optical members such as the first to third optical compensation layers and the like also function as protective layers. Thickness of the first polarizing plate and the second polarizing plate is, for example, 20 to 300 µm.

Transmittance of the first polarizing plate and the second polarizing plate is for example, 30 to 50%, preferably 35 to 45%, and more preferably 38 to 44%. Degree of polarization of the first polarizing plate and the second polarizing plate is for example, 99% or more, preferably 99.5% or more, and more preferably 99.8% or more. The degree of polarization can be measured, for example, by using a spectrophotometer (trade name "DOT-3" manufactured by Murakami Color Research Laboratory Co., Ltd.).

The first polarizer and the second polarizer can be obtained, for example, by drawing a polymer film containing a polyvinylalcohol-based polymer containing iodine. Content of iodine of the first polarizer and the second polarizer is for example, 1.8 to 5.0% by weight, and preferably 2.0 to 4.0% by weight. The first polarizer and the second polarizer preferably contain potassium as well as iodine. Content of the potassium is for example, 0.2 to 1.0% by weight, and preferably 0.3 to 0.9% by weight. The first polarizer and the second polarizer preferably contain boron as well as iodine. Content of the boron is, for example, 0.5 to 3.0% by weight, and preferably 1.0 to 2.8% by weight.

The polyvinyl alcohol-based polymer can be obtained, for example, by saponificating a vinyl ester-based polymer obtainable by polymerization of a vinyl ester-based monomer. Degree of saponification of the polyvinyl alcohol-based polymer is preferably 95.0 to 99.9% by mol. Average degree of polymerization of the polyvinyl alcohol-based polymer is preferably in the range of 1,200 to 3,600. The average degree of polymerization may be determined, for example, according to JIS K6726 (1994).

As a polymer film containing the polyvinyl alcohol-based polymer, for example, a commercially available film may be used as it is. The commercially available polymer film includes, for example, "KURARAY vinylon film" (trade name) manufactured by KURARAY Co., Ltd., "TOHCELLO vinylon film" (trade name) manufactured by TOHCELLO Co., Ltd., and "NICHIGO vinylon film" (trade name) manufactured by Nippon Synthetic Chemical Industry Co., Ltd.

[Protective Layer]

The protective layer is preferably transparent and colorless. In-plane retardation value (Re (550)) of the protective layer is for example, 0 to 10 nm, preferably 0 to 6 nm, and particularly preferably 0 to 3 nm. Retardation value (Rth (550)) in the thickness direction of the protective layer is for example, 0 to 20 nm, preferably 0 to 10 nm, and particularly preferably 0 to 6 nm.

Thickness of the protective layer is, for example, 20 to 200 µm, and preferably 30 to 100 µm.

As the protective layer, for example, a cellulose-based film is used. Generally, as the protective layer, a triacetyl cellulose film is used.

As the protective layer, for example, a commercially available polymer film being subjected to surface treatment can be used as it is. As the surface treatment, a diffusion treatment, an antireflection treatment, a hard coating treatment, and an antistatic treatment can be exemplified.

Examples of the commercially available polymer films being subjected to a diffusion treatment (antiglare treatment) include "AG150, AGS1, AGS2" (trade name) and the like manufactured by NITTO DENKO CORPORATIOIN. Examples of the commercially available polymer films being subjected to an antireflection treatment include "ARS, ARC" (trade name) and the like manufactured by NITTO DENKO CORPORATIOIN. Examples of the commercially available polymer films being subjected to a hard coating treatment and an antistatic treatment include "KC8UX-HA" (trade name) and the like manufactured by Konica Minolta Opto. Inc. Examples of the commercially available polymer films being subjected to an antireflection treatment include "ReoLook series" (trade name) and the like manufactured by NOF Corporation.

[Adhesive Layer of Optical Member]

Lamination layer of optical members such as the first polarizing plate and the first optical compensation layer is achieved, for example, via an adhesive layer.

As a material that forms the adhesive layer, conventionally known adhesives, pressure-sensitive adhesives, anchor coating agents and the like can be exemplified. The adhesive layer may have a multilayer structure in which an anchor coating layer is formed on a surface of an adhesive body, and an adhesive layer is formed thereon. Further, the adhesive layer may be a thin layer (also called "hairline") that is unrecognizable by human eyes.

It is preferable that an adhesion face of the optical member is subjected to easy adhesion treatment. The easy adhesion treatment is preferably conducted, for example, by applying a polymer material on an adhesion face. As the polymer material, for example, a silicone-based polymer, a urethane-based polymer, an acryl-based polymer and the like are preferable. An easy adhesion layer is formed on the adhesion face by conducting the easy adhesion treatment. Thickness of the easy adhesion layer is preferably 5 to 100 nm, and more preferably 10 to 80 nm.

The adhesion layer may be provided on both or either of the optical members to be adhered to each other.

When a pressure-sensitive adhesive is used as the adhesion layer, a solvent-type pressure-sensitive adhesive, a non-aqueous emulsion type pressure-sensitive adhesive, an aqueous pressure-sensitive adhesive, a hot-melt pressure-sensitive adhesive and the like can be exemplified as the pressure-sensitive adhesive. Thickness of the adhesion layer composed of the pressure-sensitive adhesive is, for example, 1 μm to 100 μm, and preferably 3 μm to 50 μm.

When an adhesive is used as the adhesion layer, for example, a water-soluble adhesive, an emulsion-type adhesive, a latex-type adhesive, a mastic adhesive, a multilayer adhesive, a paste-form adhesive, a foam-type adhesive, a supported film adhesive, a thermoplastic adhesive, a heat fusion adhesive, a heat solidification adhesive, a hot-melt adhesive, a heat active adhesive, a heat-seal adhesive, a thermosettable adhesive, a contact-type adhesive, a pressure sensitive type adhesive, a polymerization type adhesive, a solvent-type adhesive, a solvent active adhesive and the like can be exemplified as the adhesive. Thickness of the adhesion layer composed of the adhesive is, for example, 0.01 μm to 0.15 μm, and preferably 0.02 μm to 0.12 μm.

[Liquid Crystal Display]

The liquid crystal display of the present invention has the liquid crystal panel of the present invention. The liquid crystal display of the present invention may be of the same structure as a conventional liquid crystal display except that the liquid crystal panel of the present invention is included. The liquid crystal display of the present invention may be of a transmissive type in which a screen is viewed by irradiating a light from the opposite viewing side of the liquid crystal panel. Further, the liquid crystal display of the present invention may be of a reflective type in which a screen is viewed by irradiating a light from the viewing side of the liquid crystal panel. The liquid crystal display of the present invention may be of a semi-transmissive type having properties of both transmissive type and reflective type.

The liquid crystal display of the present invention is used for optional appropriate uses. Examples of the uses include office automation equipments such as a personal computer monitor, a notebook computer and a copying machine, portable equipments such as a portable telephone, a watch, a digital camera, a personal digital assistant (PDA) and a portable game machine, domestic electrical equipments such as a video camera, a television set and a microwave oven, on-vehicle equipments such as a back monitor, a monitor for a car navigation system and a car audio, display equipments such as an information monitor for a commercial store, security equipments such as an observation monitor, and care/medical equipments such as a care monitor and a medical monitor.

Preferably application of the liquid crystal display of the present invention is a TV set. Screen size of the TV set is, preferably, wide 17-inch type (373 mm×224 mm), more preferably, wide 23-inch type (499 mm×300 mm) or larger, and further preferably wide 32-inch type (687 mm×412 mm) or larger.

EXAMPLES

Next, Examples of the present invention will be described together with Comparative Examples. The present invention is not limited to the following Examples and Comparative Examples.

Various measurements in the following Examples and Comparative Examples were conducted in the following manner.

(1) Measurement of Re ($\lambda$), Rth($\lambda$), $Re_{40}$($\lambda$), Nz Coefficient, nx, ny and nz:

$Re_{40}$($\lambda$) and the like were measured by using "KOBRA21-ADH" (trade name) manufactured by Oji Scientific Instruments at 23° C. at each wavelength $\lambda$ nm. For average refractive index, values measured using an Abbe refractometer (trade name "DR-M4" manufactured by ATAGO Co., Ltd.) were used.

(2) Measurement of Thickness:

Thickness was measured by using a digital micrometer "KC-351C type" manufactured by Anritsu Corp. and "MCPD-2000" manufactured by OTSUKA ELECTRONICS CO., LTD.

(3) Measurement of Color Shift:

Color shift was measured by color change when azimuth was varied between 0 and 360° at a polar angle of 60° by using "EZ Contrast 160D" (trade name) manufactured by ELDIM Co. Measurement result was plotted on xy chromaticity diagram in which horizontal axis shows azimuth and vertical axis shows x value, y value (each graph chart).

In the measurement of color shift, when no color change is observed with varied azimuth, x value and y value do not change. That is, in the graph chart, x vale and y value are flat. Even when x value and y value do not flat, when viewing angle is changed in the axial direction of the polarizing plate for angles of 45°, 135°, 225°, 315° (when viewing angle is changed from 0° to 90° with reference to 45°, 90° to 180° with reference to 135°, 180° to 270° with reference to 225°, and 270° to 360° with reference to 315°), it results in that coloring occurs in color of only a certain direction if the color change is the same (x value and y value from viewing angle of 0° to 360° are symmetrical at 45° interval in the graph chart). However, even when coloring occurs, the coloring is in a single color. It is most preferable that x value and y value in the graph chart are flat. However, even if coloring occurs, coloring in one color will not lead any practical problem for use in a liquid crystal display. On the other hand, when color change differs at variable viewing angle in the axial direction of the polarizing plate for angle of 45°, 135°, 225°, 315° (x value and y value are asymmetrical at 45° in the graph chart), coloring occurs in various colors by varying the viewing angle. Such color change reduces viewing angle of the liquid crystal display, and is most unfavorable color change. In the graph chart, magnitude of amplitude of x value and y value represents degree of coloring, and the larger the deviation of x value, y value from the color in the axial direction of the polarizing plate (0°, 90°, 180°, 270°), the larger the coloring becomes. Therefore, in the graph chart, the smaller the amplitude of x value, y value, the better because the coloring is small.

<Using Material>
(1) Optical Compensation Layer (A):

A cellulose-based film described in Japanese Patent Application Laid-open Publication No. 2003-315538 (thickness 80 μm, degree of acetyl substitution=0.04, degree of propionyl substitution=2.76) was free-end drawn to 1.6 times at 140° C. by using a drawing machine. The film thus drawn was used as an optical compensation layer (A).

When retardation value of the optical compensation layer (A) was measured, it was found that in-plane retardation value Re (590) was 88 nm, and retardation value in the thickness direction Rth(590) was 95 nm. Further, wavelength dispersion of the optical compensation layer (A) is reverse dispersion as shown in Table 1.

Index ellipsoid of the optical compensation layer (A) satisfied nx>ny>nz. Nz coefficient of the optical compensation layer (A) was 1.08.

TABLE 1

| | $Re_{40}(450)/$ $Re_{40}(550)$ | $Re_{40}(550)/$ $Re_{40}(550)$ | $Re_{40}(650)/$ $Re_{40}(550)$ | Wavelength dispersion |
|---|---|---|---|---|
| Optical compensation layer (A) | 0.84 | 1.00 | 1.09 | Reverse dispersion |

TABLE 1-continued

| | $Re_{40}(450)/$ $Re_{40}(550)$ | $Re_{40}(550)/$ $Re_{40}(550)$ | $Re_{40}(650)/$ $Re_{40}(550)$ | Wavelength dispersion |
|---|---|---|---|---|
| Optical compensation layer (B) | 1.09 | 1.00 | 0.96 | Positive dispersion |
| Optical compensation layer (C) | 1.06 | 1.00 | 0.97 | Positive dispersion |
| Optical compensation layer (D) | 0.84 | 1.00 | 1.09 | Reverse dispersion |
| Optical compensation layer (E) | 1.09 | 1.00 | 0.96 | Positive dispersion |
| Optical compensation layer (F) | 0.83 | 1.00 | 1.07 | Reverse dispersion |
| Optical compensation layer (G) | 1.09 | 1.00 | 0.96 | Positive dispersion |
| Optical compensation layer (H) | 1.00 | 1.00 | 1.00 | Flat dispersion |
| Optical compensation layer (I) | 0.81 | 1.00 | 1.14 | Reverse dispersion |
| Optical compensation layer (J) | 1.06 | 1.00 | 0.97 | Positive dispersion |
| Liquid crystal cell | 1.04 | 1.00 | 0.96 | Positive dispersion |

(2) Optical Compensation Layer (B):

Polyimide (shown by the formula (III) below) synthesized from 2,2'-bis(3,4-dicarboxyphenyl)hexafluoropropane and 2,2'-bis(trifluoromethyl)-4,4'-diaminebiphenyl was dissolved in cyclohexanone, to prepare a coating solution (solid concentration 15% by weight). This coating solution was applied on 50 μm PET film so that the thickness thereof was 18 μm. The application was followed by drying at 100° C. for 10 minutes, to form a thin film having thickness of about 2.8 μm. This film having thickness of about 2.8 μm was used as an optical compensation layer (B).

The optical compensation layer (B) was transferred to a glass plate via a pressure-sensitive adhesive, and peeled from the PET film. When retardation value of this optical compensation layer (B) transferred to the glass plate was measured, it was found that in-plane retardation value Re (590) was 0.4 nm, and retardation value in the thickness direction Rth(590) was 111 nm. Further, wavelength dispersion of the optical compensation layer (B) is positive dispersion as shown in Table 1.

Further, index ellipsoid of the optical compensation layer (B) satisfied nx=ny>nz.

[Chemical Formula 3]

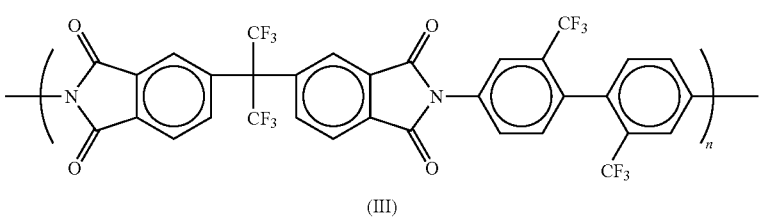

(III)

(3) Optical Compensation Layer (C):

A polyester-based polymer described in Example 4 of [0052] in Japanese Patent Application Laid-Open Publication No. 2004-70332 (polymer (IV) in that publication) was dissolved in a mixed solvent (toluene: cyclohexanone (weight ratio)=8:2), to prepare a coating solution (solid concentration 10% by weight). This coating solution was applied on 50 μm PET film so that the thickness thereof was 40 μm. The application was followed by drying at 130° C. for 5 minutes, to form a thin film having thickness of about 4.0 μm. This film having thickness of about 4.0 μm was used as an optical compensation layer (C).

The optical compensation layer (C) was transferred to a glass plate via a pressure-sensitive adhesive, and peeled from the PET film. When retardation value of this optical compensation layer (C) transferred to the glass plate was measured, it was found that in-plane retardation value Re (590) was 0.3 nm, and retardation value in the thickness direction Rth(590) was 112 nm. Further, wavelength dispersion of the optical compensation layer (C) is positive dispersion as shown in Table 1.

Further, index ellipsoid of the optical compensation layer (C) satisfied nx=ny>nz.

(4) Optical Compensation Layer (D):

The cellulose-based film used in the optical compensation layer (A) was free-end drawn to 1.4 times at 130° C. by using a drawing machine. The film thus drawn was used as an optical compensation layer (D).

When retardation value of the optical compensation layer (D) was measured, it was found that in-plane retardation value Re (590) was 87 nm, and retardation value in the thickness direction Rth(590) was 111 nm. Further, wavelength dispersion of the optical compensation layer (D) is reverse dispersion as shown in Table 1.

Index ellipsoid of the optical compensation layer (D) satisfied nx>ny>nz. Nz coefficient of the optical compensation layer (D) was 1.28.

(5) Optical Compensation Layer (E):

The polyimide (shown by the formula (III) above) used in the optical compensation layer (B) was dissolved in cyclohexanone, to prepare a coating solution (solid concentration 15% by weight). This coating solution was applied on 50 μm PET film so that the thickness thereof was 13.8 μm. The application was followed by drying at 100° C. for 10 minutes, to form a thin film having thickness of about 1.7 μm. This film having thickness of about 1.7 μm was used as an optical compensation layer (E).

The optical compensation layer (E) was transferred to a glass plate via a pressure-sensitive adhesive, and peeled from the PET film. When retardation value of this optical compensation layer (E) transferred to the glass plate was measured, it was found that in-plane retardation value Re (590) was 0.2 nm, and retardation value in the thickness direction Rth(590) was 85 nm. Further, wavelength dispersion of the optical compensation layer (E) is positive dispersion as shown in Table 1.

Further, index ellipsoid of the optical compensation layer (E) satisfied nx=ny>nz.

(6) Optical Compensation Layer (F):

A modified polymer described in Example 3 of [0103]-[0106] in Japanese Patent Application Laid-Open Publication No. 2007-161993 ([chemical formula 14] in that publication) was casted on a base material, to form a modified polyvinylacetal-based polymer film having dry thickness of 110 μm. After peeling this film from the base material, the film was free-end drawn to 1.4 times at 130° C. by using a drawing machine. The film thus drawn was used as an optical compensation layer (F).

When retardation value of the optical compensation layer (F) was measured, it was found that in-plane retardation value Re (590) was 88 nm, and retardation value in the thickness direction Rth(590) was 97 nm. Further, wavelength dispersion of the optical compensation layer (F) is reverse dispersion as shown in Table 1.

Index ellipsoid of the optical compensation layer (F) satisfied nx>ny>nz. Nz coefficient of the optical compensation layer (F) was 1.10.

(7) Optical Compensation Layer (G):

The polyimide (shown by the formula (III) above) used in the optical compensation layer (B) was dissolved in cyclohexanone, to prepare a coating solution (solid concentration 15% by weight). This coating solution was applied on 50 μm PET film so that the thickness thereof was 9.7 μm. The application was followed by drying at 100° C. for 10 minutes, to form a thin film having thickness of about 1.5 μm. This film having thickness of about 1.5 μm was used as an optical compensation layer (G).

The optical compensation layer (G) was transferred to a glass plate via a pressure-sensitive adhesive, and peeled from the PET film. When retardation value of this optical compensation layer (G) transferred to the glass plate was measured, it was found that in-plane retardation value Re (590) was 0.4 nm, and retardation value in the thickness direction Rth(590) was 58 nm. Further, wavelength dispersion of the optical compensation layer (G) is positive dispersion as shown in Table 1.

Further, index ellipsoid of the optical compensation layer (G) satisfied nx=ny>nz.

(8) Optical Compensation Layer (H):

A norbornene-based polymer film ("ARTON" (trade name) manufactured by JSR Corporation) having thickness of 100 μm was drawn to 1.9 times in the X axial direction and 1.9 times in the Y axial direction at 140° C. The film thus drawn was used as an optical compensation layer (H). When retardation value of the optical compensation layer (H) was measured, it was found that in-plane retardation value Re (590) was 1.4 nm, and retardation value in the thickness direction Rth(590) was 113 nm. Further, wavelength dispersion of the optical compensation layer (H) is flat dispersion as shown in Table 1.

Index ellipsoid of the optical compensation layer (H) satisfied nx=ny>nz.

(9) Optical Compensation Layer (I):

Two cellulose-based films having thickness of 80 μm ("TF80UL" (trade name) manufactured by FUJIFILM Corporation) were laminated via an acrylic pressure-sensitive adhesive having thickness of 20 μm, to prepare optical compensation layer (I).

When retardation value of the optical compensation layer (I) was measured, it was found that in-plane retardation value Re (590) was 0.9 nm, and retardation value in the thickness direction Rth(590) was 118 nm. Further, wavelength dispersion of the optical compensation layer (I) is reverse dispersion as shown in Table 1.

Index ellipsoid of the optical compensation layer (I) satisfied nx=ny>nz.

(10) Optical Compensation Layer (J):

A polycarbonate-based film ("ELMECH PP film" (trade name) manufactured by Kaneka Corporation) having thickness of 55 μm was free-end drawn to 1.1 times at 140° C. by using a drawing machine. The film thus drawn was used as an optical compensation layer (J).

When retardation value of the optical compensation layer (J) was measured, it was found that in-plane retardation value Re (590) was 90 nm, and retardation value in the thickness direction Rth(590) was 95 nm. Further, wavelength dispersion of the optical compensation layer (I) is positive dispersion as shown in Table 1.

Index ellipsoid of the optical compensation layer (J) satisfied nx>ny>nz. Nz coefficient of the optical compensation layer (J) was 1.06.

(11) Liquid Crystal Cell:

A liquid crystal panel was taken out from a commercially available liquid crystal television set (product number: LC-46GX2W) manufactured by SHARP Corporation, and all optical films such as polarizing plate disposed above and below the liquid crystal cell were removed. The glass plate of this liquid crystal cell was cleaned on both front and back sides, to thereby prepare a liquid crystal cell.

Wavelength dispersion of the liquid crystal cell is positive dispersion as shown in Table 1. Index ellipsoid of the liquid crystal cell satisfied nx=ny<nz.

Example 1

The optical compensation layer (A) was laminated and adhered to a polarizing plate ("SIG" (trade name) manufactured by NITTO DENKO CORPORATION) via an acrylic pressure-sensitive adhesive having thickness of 20 μm, to thereby prepare a polarizing plate (A) having a compensation layer. At this time, these members were laminated so that the direction of slow axis of the optical compensation layer (A) and the direction of absorption axis of the polarizing plate are orthogonal to each other. The polarizing plate (A) having a compensation layer was prepared in duplicate.

On the other hand, either one of the two polarizing plates (A) having a compensation layer prepared in the above was selected. The optical compensation layer (B) was laminated and adhered to a surface of optical compensation layer (A) of the polarizing plate (A) having a compensation layer (the surface on the side opposite to the adhesion face of the polarizing plate (A)) via an acrylic pressure-sensitive adhesive having thickness of 20 μm. In this manner, a polarizing plate (AB) having a compensation layer was prepared in which a polarizing plate, an optical compensation layer (A) and an optical compensation layer (B) are laminated in this order.

Next, on the viewing side of the liquid crystal cell, the polarizing plate (A) having a compensation layer was bonded via an acrylic pressure-sensitive adhesive having thickness of 20 μm. At this time, bonding was made so that optical compensation layer (A) side of the polarizing plate (A) having a compensation layer faces with the viewing side of the liquid crystal cell, and the direction of absorption axis of the polarizing plate (A) having a compensation layer is parallel with the direction of long side of the liquid crystal cell.

Next, on the opposite viewing side of the liquid crystal cell, the polarizing plate (AB) having a compensation layer was bonded via an acrylic pressure-sensitive adhesive having thickness of 20 μm. At this time, bonding was made so that optical compensation layer (B) side of the polarizing plate (AB) having a compensation layer faces with the opposite viewing side of the liquid crystal cell, and the direction of absorption axis of the polarizing plate (AB) having a compensation layer is orthogonal to the direction of long side of the liquid crystal cell.

In this manner, a liquid crystal panel according to Example 1 was fabricated (see Table 2).

The liquid crystal panel of Example 1 was joined with a backlight unit of the original liquid crystal TV set (above liquid crystal TV set manufactured by SHARP Corporation), to fabricate a liquid crystal TV set.

Figure 5:
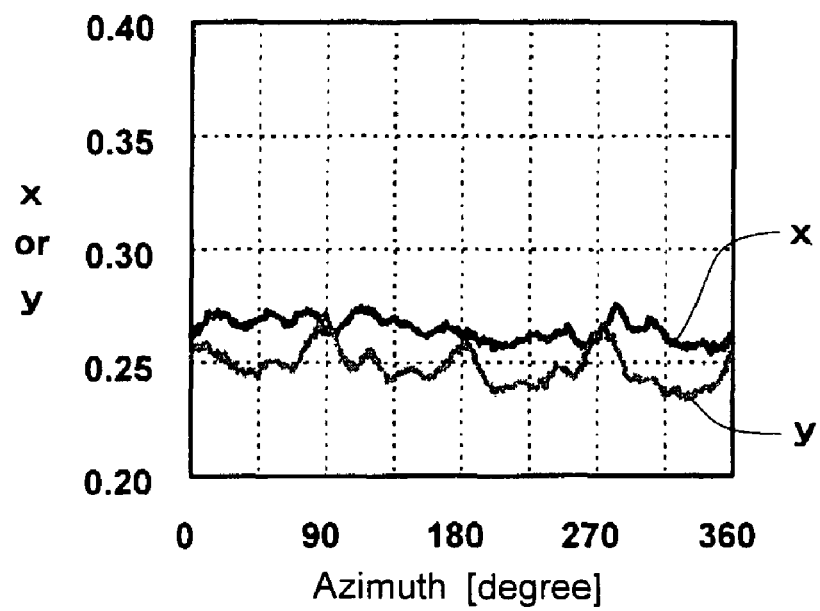
FIG. 5 is a graph showing a result of color shift of Example 1 of the present invention.

Measurement result of color shift of the obtained liquid crystal TV set is shown in the graph of FIG. 5.

TABLE 2

| | Layer structure | Applied compensation layer | Wavelength dispersion of each layer | Index ellipsoid |
|---|---|---|---|---|
| Example 1 | First optical compensation layer | Optical compensation layer (A) | Reverse dispersion | nx > ny > nz |
| | Liquid crystal cell | Liquid crystal cell | Positive dispersion | nx = ny < nz |
| | Third optical compensation layer | Optical compensation layer (B) | Positive dispersion | nx = ny > nz |
| | Second optical compensation layer | Optical compensation layer (A) | Reverse dispersion | nx > ny > nz |
| Example 2 | First optical compensation layer | Optical compensation layer (A) | Reverse dispersion | nx > ny > nz |
| | Liquid crystal cell | Liquid crystal cell | Positive dispersion | nx = ny < nz |
| | Third optical compensation layer | Optical compensation layer (C) | Positive dispersion | nx = ny > nz |
| | Second optical compensation layer | Optical compensation layer (A) | Reverse dispersion | nx > ny > nz |
| Example 3 | First optical compensation layer | Optical compensation layer (D) | Reverse dispersion | nx > ny > nz |
| | Liquid crystal cell | Liquid crystal cell | Positive dispersion | nx = ny < nz |
| | Third optical compensation layer | Optical compensation layer (E) | Positive dispersion | nx = ny > nz |
| | Second optical compensation layer | Optical compensation layer (D) | Reverse dispersion | nx > ny > nz |
| Example 4 | First optical compensation layer | Optical compensation layer (F) | Reverse dispersion | nx > ny > nz |
| | Liquid crystal cell | Liquid crystal cell | Positive dispersion | nx = ny < nz |

TABLE 2-continued

| | Layer structure | Applied compensation layer | Wavelength dispersion of each layer | Index ellipsoid |
|---|---|---|---|---|
| Example 5 | Third optical compensation layer | Optical compensation layer (B) | Positive dispersion | nx = ny > nz |
| | Second optical compensation layer | Optical compensation layer (F) | Reverse dispersion | nx > ny > nz |
| | First optical compensation layer | Optical compensation layer (F) | Reverse dispersion | nx > ny > nz |
| | Liquid crystal cell | Liquid crystal cell | Positive dispersion | nx = ny < nz |
| | Third optical compensation layer | Optical compensation layer (G) | Positive dispersion | nx = ny > nz |
| | Second optical compensation layer | Optical compensation layer (F) | Reverse dispersion | nx > ny > nz |

Example 2

One polarizing plate (A) having a compensation layer and one polarizing plate (AC) having a compensation layer were fabricated in a similar manner as in Example 1 except that the optical compensation layer (B) used in Example 1 was replaced by the optical compensation layer (C).

In the polarizing plate (AC) having a compensation layer, a polarizing plate, an optical compensation layer (A) and an optical compensation layer (C) are laminated in this order.

Then the polarizing plate (A) having a compensation layer was bonded on the viewing side of the liquid crystal cell and the polarizing plate (AC) having a compensation layer was bonded on the opposite viewing side of the liquid crystal cell in a similar manner as in Example 1.

In this manner, a liquid crystal panel according to Example 2 was fabricated (see Table 2).

The liquid crystal panel of Example 2 was joined to a backlight unit of the original liquid crystal TV set in a similar manner as in Example 1, to fabricate a liquid crystal TV set.

Figure 6:
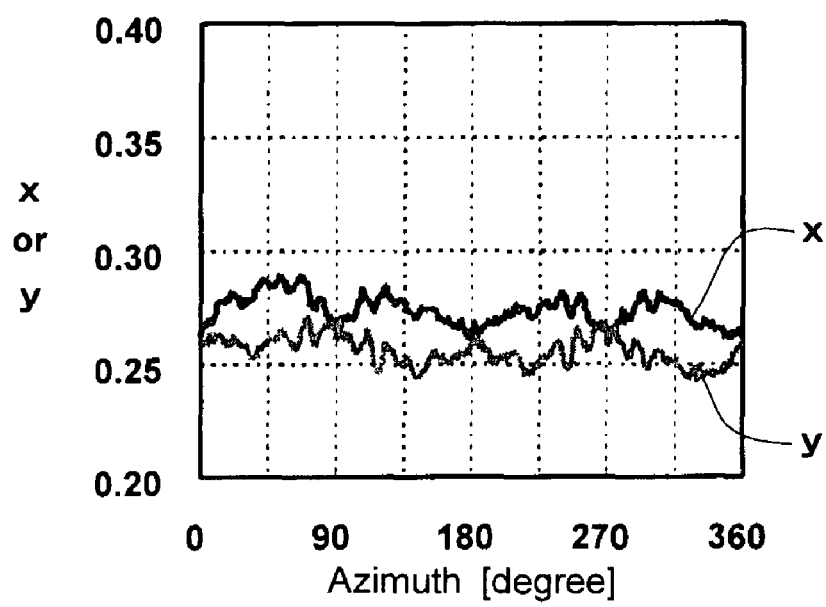
FIG. 6 is a graph showing a result of color shift of Example 2 of the present invention.

Measurement result of color shift of the obtained liquid crystal TV set is shown in the graph of FIG. 6.

Example 3

The optical compensation layer (D) was laminated and adhered to a polarizing plate ("SIG" (trade name) manufactured by NITTO DENKO CORPORATION) via an acrylic pressure-sensitive adhesive having thickness of 20 μm, to thereby prepare a polarizing plate (D) having a compensation layer. At this time, these members were laminated so that the direction of slow axis of the optical compensation layer (D) and the direction of absorption axis of the polarizing plate are orthogonal to each other. The polarizing plate (D) having a compensation layer was prepared in duplicate.

On the other hand, either one of the two polarizing plates (D) having a compensation layer prepared in the above was selected. The optical compensation layer (E) was laminated and adhered to a surface of optical compensation layer (D) of the polarizing plate (D) having a compensation layer (the surface on the side opposite to the adhesion face of the polarizing plate (D)) via an acrylic pressure-sensitive adhesive having thickness of 20 μm. In this manner, a polarizing plate (DE) having a compensation layer was prepared in which a polarizing plate, an optical compensation layer (D) and an optical compensation layer (E) are laminated in this order.

Next, on the viewing side of the liquid crystal cell, the polarizing plate (D) having a compensation layer was bonded via an acrylic pressure-sensitive adhesive having thickness of 20 μm. At this time, bonding was made so that optical compensation layer (D) side of the polarizing plate (D) having a compensation layer faces with the viewing side of the liquid crystal cell, and the direction of absorption axis of the polarizing plate (D) having a compensation layer is parallel with the direction of long side of the liquid crystal cell.

Next, on the opposite viewing side of the liquid crystal cell, the polarizing plate (DE) having a compensation layer was bonded via an acrylic pressure-sensitive adhesive having thickness of 20 μm. At this time, bonding was made so that optical compensation layer (E) side of the polarizing plate (DE) having a compensation layer faces with the opposite viewing side of the liquid crystal cell, and the direction of absorption axis of the polarizing plate (DE) having a compensation layer is orthogonal to the direction of long side of the liquid crystal cell.

In this manner, a liquid crystal panel according to Example 3 was fabricated (see Table 2).

The liquid crystal panel of Example 3 was joined to a backlight unit of the original liquid crystal TV set in a similar manner as in Example 1, to fabricate a liquid crystal TV set.

Figure 7:
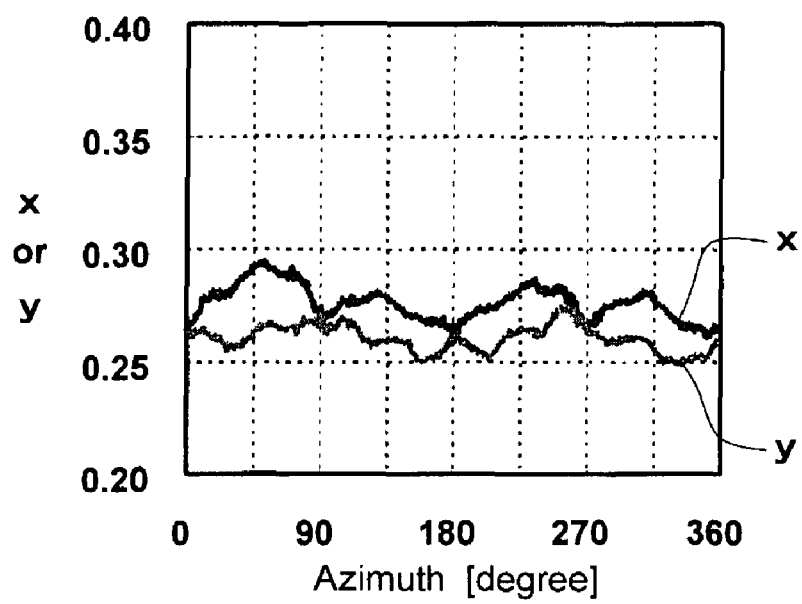
FIG. 7 is a graph showing a result of color shift of Example 3 of the present invention.

Measurement result of color shift of the obtained liquid crystal TV set is shown in the graph of FIG. 7.

Example 4

The optical compensation layer (F) was laminated and adhered to a polarizing plate ("SIG" (trade name) manufactured by NITTO DENKO CORPORATION) via an acrylic pressure-sensitive adhesive having thickness of 20 μm, to thereby prepare a polarizing plate (F) having a compensation layer. At this time, these members were laminated so that the direction of slow axis of the optical compensation layer (F) and the direction of absorption axis of the polarizing plate are orthogonal to each other. The polarizing plate (F) having a compensation layer was prepared in duplicate.

On the other hand, either one of the two polarizing plates (F) having a compensation layer prepared in the above was selected. The optical compensation layer (B) was laminated and adhered to a surface of optical compensation layer (F) of the polarizing plate (F) having a compensation layer (the surface on the side opposite to the adhesion face of the polarizing plate (F)) via an acrylic pressure-sensitive adhesive having thickness of 20 μm. In this manner, a polarizing plate (FB) having a compensation layer was prepared in which a polarizing plate, an optical compensation layer (F) and an optical compensation layer (B) are laminated in this order.

Next, on the viewing side of the liquid crystal cell, the polarizing plate (F) having a compensation layer was bonded via an acrylic pressure-sensitive adhesive having thickness of 20 μm. At this time, bonding was made so that optical compensation layer (F) side of the polarizing plate (F) having a compensation layer faces with the viewing side of the liquid crystal cell, and the direction of absorption axis of the polarizing plate (F) having a compensation layer is parallel with the direction of long side of the liquid crystal cell.

Next, on the opposite viewing side of the liquid crystal cell, the polarizing plate (FB) having a compensation layer was bonded via an acrylic pressure-sensitive adhesive having thickness of 20 μm. At this time, bonding was made so that optical compensation layer (B) side of the polarizing plate (FB) having a compensation layer faces with the opposite viewing side of the liquid crystal cell, and the direction of absorption axis of the polarizing plate (FB) having a compensation layer is orthogonal to the direction of long side of the liquid crystal cell.

In this manner, a liquid crystal panel according to Example 4 was fabricated (see Table 2).

The liquid crystal panel of Example 4 was joined to a backlight unit of the original liquid crystal TV set in a similar manner as in Example 1, to fabricate a liquid crystal TV set.

Figure 8:
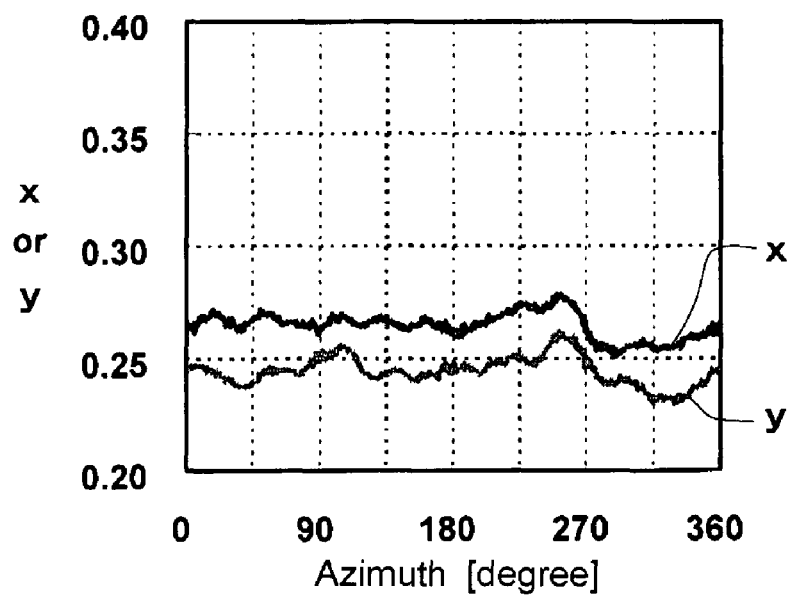
FIG. 8 is a graph showing a result of color shift of Example 4 of the present invention.

Measurement result of color shift of the obtained liquid crystal TV set is shown in the graph of FIG. 8.

Example 5

One polarizing plate (F) having a compensation layer and one polarizing plate (FG) having a compensation layer were fabricated in a similar manner as in Example 4 except that the optical compensation layer (B) used in Example 4 was replaced by the optical compensation layer (G).

In the polarizing plate (FG) having a compensation layer, a polarizing plate, an optical compensation layer (F) and an optical compensation layer (G) are laminated in this order.

Then the polarizing plate (F) having a compensation layer was bonded on the viewing side of the liquid crystal cell and the polarizing plate (FG) having a compensation layer was bonded on the opposite viewing side of the liquid crystal cell in a similar manner as in Example 1.

In this manner, a liquid crystal panel according to Example 5 was fabricated (see Table 2).

The liquid crystal panel of Example 5 was joined to a backlight unit of the original liquid crystal TV set in a similar manner as in Example 1, to fabricate a liquid crystal TV set.

Figure 9:
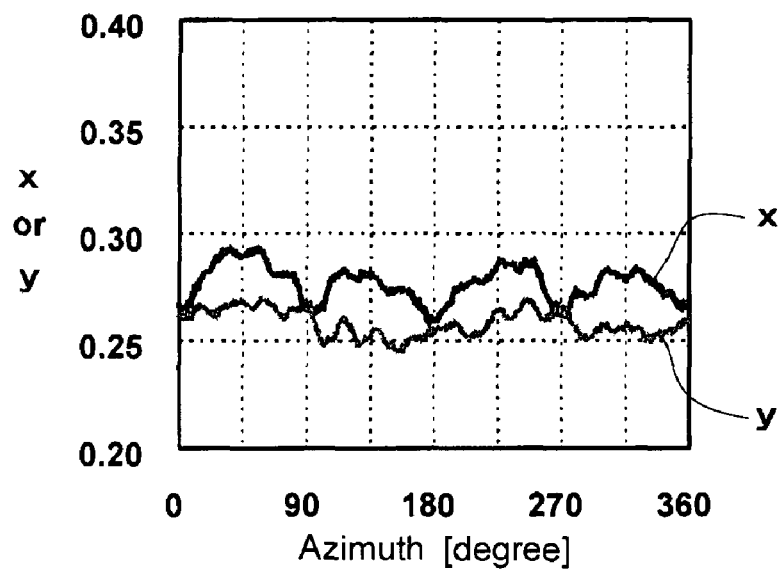
FIG. 9 is a graph showing a result of color shift of Example 5 of the present invention.

Measurement result of color shift of the obtained liquid crystal TV set is shown in the graph of FIG. 9.

Comparative Example 1

One polarizing plate (A) having a compensation layer and one polarizing plate (AH) having a compensation layer were fabricated in a similar manner as in Example 1 except that the optical compensation layer (B) used in Example 1 was replaced by the optical compensation layer (H).

In the polarizing plate (AH) having a compensation layer, a polarizing plate, an optical compensation layer (A) and an optical compensation layer (H) are laminated in this order.

Then the polarizing plate (A) having a compensation layer was bonded on the viewing side of the liquid crystal cell and the polarizing plate (AH) having a compensation layer was bonded on the opposite viewing side of the liquid crystal cell in a similar manner as in Example 1.

In this manner, a liquid crystal panel according to Comparative example 1 was fabricated (see Table 3).

The liquid crystal panel of Comparative example 1 was joined to a backlight unit of the original liquid crystal TV set in a similar manner as in Example 1, to fabricate a liquid crystal TV set.

Figure 10:
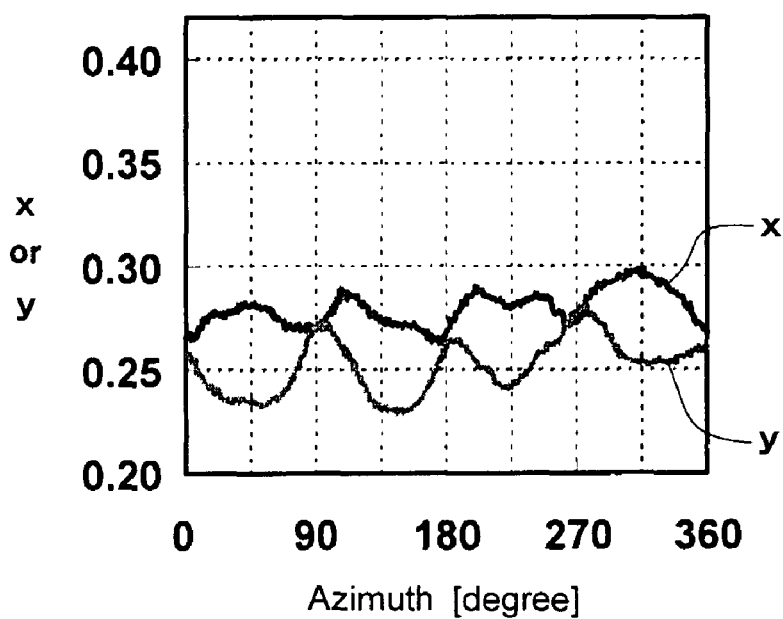
FIG. 10 is a graph showing a result of color shift of Comparative example 1.

Measurement result of color shift of the obtained liquid crystal TV set is shown in the graph of FIG. 10.

TABLE 3

|  | Layer structure | Applied compensation layer | Wavelength dispersion of each layer | Index ellipsoid |
|---|---|---|---|---|
| Comparative example 1 | First optical compensation layer | Optical compensation layer (A) | Reverse dispersion | $nx > ny > nz$ |
|  | Liquid crystal cell | Liquid crystal cell | Positive dispersion | $nx = ny < nz$ |
|  | Third optical compensation layer | Optical compensation layer (H) | Flat dispersion | $nx = ny > nz$ |
|  | Second optical compensation layer | Optical compensation layer (A) | Reverse dispersion | $nx > ny > nz$ |
| Comparative example 2 | First optical compensation layer | Optical compensation layer (A) | Reverse dispersion | $nx > ny > nz$ |
|  | Liquid crystal cell | Liquid crystal cell | Positive dispersion | $nx = ny < nz$ |
|  | Third optical compensation layer | Optical compensation layer (I) | Reverse dispersion | $nx = ny > nz$ |
|  | Second optical compensation layer | Optical compensation layer (A) | Reverse dispersion | $nx > ny > nz$ |
| Comparative example 3 | First optical compensation layer | Optical compensation layer (J) | Positive dispersion | $nx > ny > nz$ |
|  | Liquid crystal cell | Liquid crystal cell | Positive dispersion | $nx = ny < nz$ |

TABLE 3-continued

| | Layer structure | Applied compensation layer | Wavelength dispersion of each layer | Index ellipsoid |
|---|---|---|---|---|
| | Third optical compensation layer | Optical compensation layer (B) | Positive dispersion | nx = ny > nz |
| | Second optical compensation layer | Optical compensation layer (J) | Positive dispersion | nx > ny > nz |
| Comparative example 4 | First optical compensation layer | Optical compensation layer (F) | Reverse dispersion | nx > ny > nz |
| | Liquid crystal cell | Liquid crystal cell | Positive dispersion | nx = ny < nz |
| | Third optical compensation layer | Optical compensation layer (I) | Reverse dispersion | nx = ny > nz |
| | Second optical compensation layer | Optical compensation layer (F) | Reverse dispersion | nx > ny > nz |

Comparative Example 2

One polarizing plate (A) having a compensation layer and one polarizing plate (AI) having a compensation layer were fabricated in a similar manner as in Example 1 except that the optical compensation layer (B) used in Example 1 was replaced by the optical compensation layer (I).

In the polarizing plate (AI) having a compensation layer, a polarizing plate, an optical compensation layer (A) and an optical compensation layer (I) are laminated in this order.

Then the polarizing plate (A) having a compensation layer was bonded on the viewing side of the liquid crystal cell and the polarizing plate (AI) having a compensation layer was bonded on the opposite viewing side of the liquid crystal cell in a similar manner as in Example 1.

In this manner, a liquid crystal panel according to Comparative example 2 was fabricated (see Table 3).

The liquid crystal panel of Comparative example 2 was joined to a backlight unit of the original liquid crystal TV set in a similar manner as in Example 1, to fabricate a liquid crystal TV set.

Figure 11:
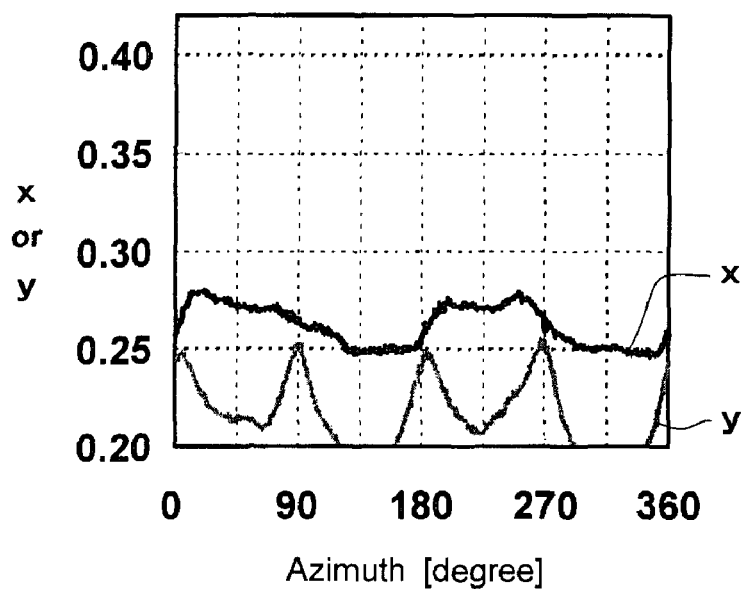
FIG. 11 is a graph showing a result of color shift of Comparative example 2.

Measurement result of color shift of the obtained liquid crystal TV set is shown in the graph of FIG. 11.

Comparative Example 3

The optical compensation layer (J) was laminated and adhered to a polarizing plate ("SIG" (trade name) manufactured by NITTO DENKO CORPORATION) via an acrylic pressure-sensitive adhesive having thickness of 20 μm, to thereby prepare a polarizing plate (J) having a compensation layer. At this time, these members were laminated so that the direction of slow axis of the optical compensation layer (J) and the direction of absorption axis of the polarizing plate are orthogonal to each other. The polarizing plate (J) having a compensation layer was prepared in duplicate.

On the other hand, either one of the two polarizing plates (J) having a compensation layer prepared in the above was selected. The optical compensation layer (B) was laminated and adhered to a surface of optical compensation layer (J) of the polarizing plate (J) having a compensation layer (the surface on the side opposite to the adhesion face of the polarizing plate (J)) via an acrylic pressure-sensitive adhesive having thickness of 20 μm. In this manner, a polarizing plate (JB) having a compensation layer was prepared in which a polarizing plate, an optical compensation layer (J) and an optical compensation layer (B) are laminated in this order.

Next, on the viewing side of the liquid crystal cell, the polarizing plate (J) having a compensation layer was bonded via an acrylic pressure-sensitive adhesive having thickness of 20 μm. At this time, bonding was made so that optical compensation layer (J) side of the polarizing plate (J) having a compensation layer faces with the viewing side of the liquid crystal cell, and the direction of absorption axis of the polarizing plate (J) having a compensation layer is parallel with the direction of long side of the liquid crystal cell.

Next, on the opposite viewing side of the liquid crystal cell, the polarizing plate (JB) having a compensation layer was bonded via an acrylic pressure-sensitive adhesive having thickness of 20 μm. At this time, bonding was made so that optical compensation layer (B) side of the polarizing plate (JB) having a compensation layer faces with the opposite viewing side of the liquid crystal cell, and the direction of absorption axis of the polarizing plate (JB) having a compensation layer is orthogonal to the direction of long side of the liquid crystal cell.

In this manner, a liquid crystal panel according to Comparative example 3 was fabricated (see Table 3).

The liquid crystal panel of Comparative example 3 was joined to a backlight unit of the original liquid crystal TV set in a similar manner as in Example 1, to fabricate a liquid crystal TV set.

Figure 12:
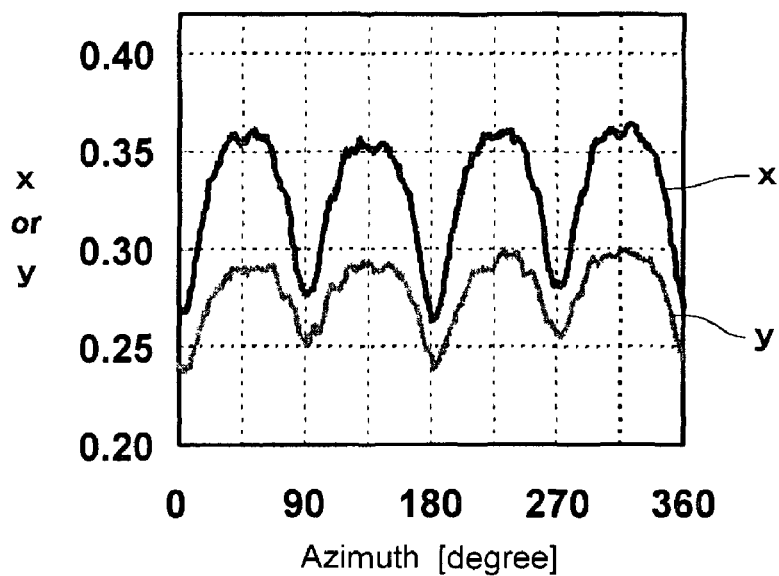
FIG. 12 is a graph showing a result of color shift of Comparative example 3.

Measurement result of color shift of the obtained liquid crystal TV set is shown in the graph of FIG. 12.

Comparative Example 4

One polarizing plate (F) having a compensation layer and one polarizing plate (FI) having a compensation layer were fabricated in a similar manner as in Example 4 except that the optical compensation layer (B) used in Example 4 was replaced by the optical compensation layer (I).

In the polarizing plate (FI) having a compensation layer, a polarizing plate, an optical compensation layer (F) and an optical compensation layer (I) are laminated in this order.

Then the polarizing plate (F) having a compensation layer was bonded on the viewing side of the liquid crystal cell and the polarizing plate (FI) having a compensation layer was bonded on the opposite viewing side of the liquid crystal cell in a similar manner as in Example 4.

In this manner, a liquid crystal panel according to Comparative example 4 was fabricated (see Table 3).

The liquid crystal panel of Comparative example 4 was joined to a backlight unit of the original liquid crystal TV set in a similar manner as in Example 4, to fabricate a liquid crystal TV set.

Figure 13:
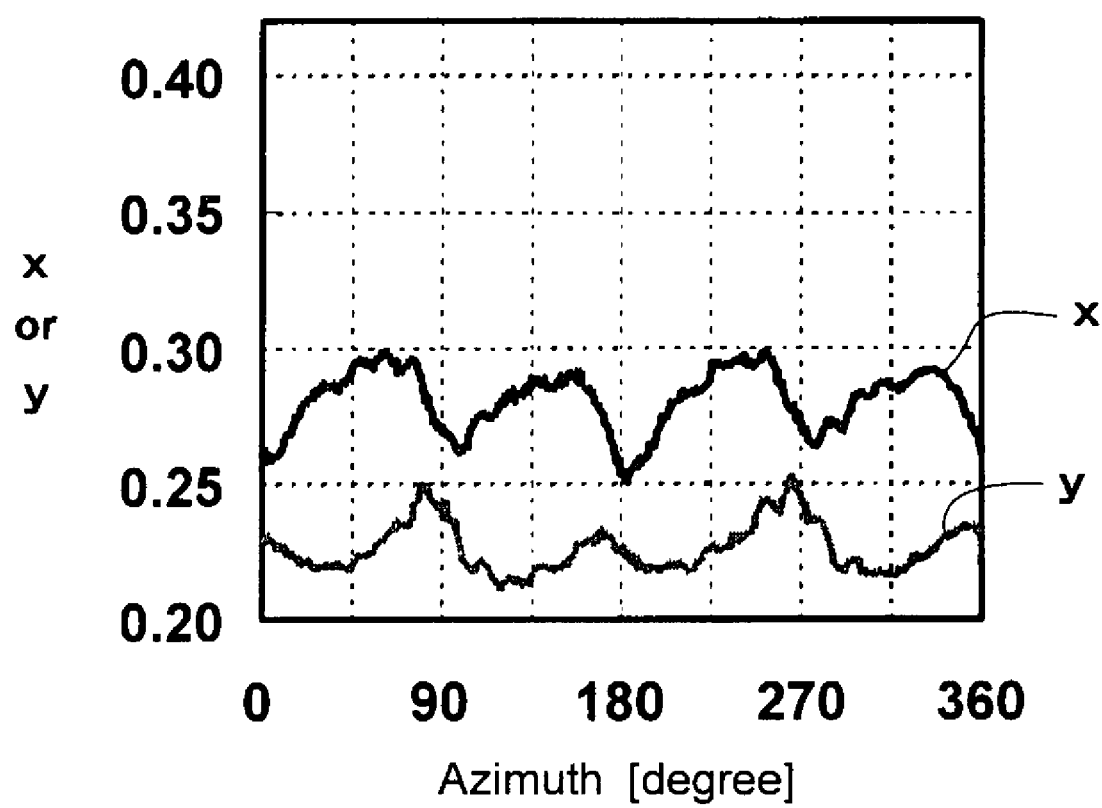
FIG. 13 is a graph showing a result of color shift of Comparative example 4.

Measurement result of color shift of the obtained liquid crystal TV set is shown in the graph of FIG. 13.

It can be seen that the liquid crystal panels of Examples 1 to 5 show smaller color shift amounts compared to the liquid crystal panels of Comparative examples 1 to 4. Therefore, the liquid crystal panels of Examples 1 to 5 are able to achieve neutral display with substantially no coloring in every orientation.

What is claimed is:

1. A liquid crystal panel comprising a first polarizer and a second polarizer disposed on both sides of a liquid crystal cell, and a first optical compensation layer disposed between the liquid crystal cell and the first polarizer, a second optical compensation layer disposed between the liquid crystal cell and the second polarizer, and a third optical compensation layer disposed between the first optical compensation layer and the second optical compensation layer, wherein wavelength dispersion of the liquid crystal cell satisfies $Re_{40}(450) > Re_{40}(550) > Re_{40}(650)$, wavelength dispersion of the first optical compensation layer and wavelength dispersion of the second optical compensation layer satisfy $0.7 < Re_{40}(450)/Re_{40}(550) < 1.05$, and wavelength dispersion of the third optical compensation layer satisfies $Re_{40}(450) > Re_{40}(550) > Re_{40}(650)$, provided that $Re_{40}(\lambda)$ represents retardation value measured from the direction of polar angle of 40° at 23° C. with light of wavelength $\lambda$ nm, $Re_{40}(\lambda) = (nx-ny) \times d_{40}$, the nx represents refractive index in the direction in which refractive index is maximum in a plane of optical compensation layer or liquid crystal cell (X axial direction), the ny represents refractive index in the direction orthogonal to the X axial direction in the plane, and $d_{40}$ represents light path length (nm) from the direction of polar angle of 40°.

2. The liquid crystal panel according to claim 1, wherein the first optical compensation layer and the second optical compensation layer satisfy the relationship of $nx > ny \geq nz$.

3. The liquid crystal panel according to claim 1, wherein the third optical compensation layer satisfies the relationship of $nx \geq ny > nz$.

4. The liquid crystal panel according to claim 1, wherein Nz coefficient of the third optical compensation layer is larger than Nz coefficient of the first optical compensation layer and the second optical compensation layer.

5. The liquid crystal panel according to claim 1, wherein ratio of retardation value ($Re_{40}(450)/Re_{40}(550)$) of the first optical compensation layer and ratio of retardation value ($Re_{40}(450)/Re_{40}(550)$) of the second optical compensation layer are smaller than ratio of retardation value ($Re_{40}(450)/Re_{40}(550)$) of the liquid crystal cell.

6. The liquid crystal panel according to claim 1, wherein the first optical compensation layer and the second optical compensation layer contain at least one polymer selected from the group consisting of a cellulose-based, a modified polyvinyl acetal-based, and a polyester-based polymer as a principal component.

7. The liquid crystal panel according to claim 1, wherein the third optical compensation layer contains at least one polymer selected from the group consisting of a polyamide-based, a polyimide-based, a polyester-based, a polyetherketone-based, a polyamideimide-based, and a polyesterimide-based polymer as a principal component.

8. The liquid crystal panel according to claim 1, wherein the liquid crystal cell is in a vertically aligned (VA) mode.

9. A liquid crystal display having the liquid crystal panel according to claim 1.

* * * * *